United States Patent
Takemura

(10) Patent No.: US 9,384,431 B2
(45) Date of Patent: *Jul. 5, 2016

(54) IMAGE PROCESSING APPARATUS, METHOD, AND STORAGE MEDIUM THAT PERFORM QUANTIZING PROCESSING OF IMAGE DATA FOR AT LEAST N COLORS

(71) Applicant: CANON KABUSHIKI KAISHA, Tokyo (JP)

(72) Inventor: Hideki Takemura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/244,120

(22) Filed: Apr. 3, 2014

(65) Prior Publication Data

US 2014/0218770 A1 Aug. 7, 2014

Related U.S. Application Data

(63) Continuation of application No. 13/107,193, filed on May 13, 2011, now Pat. No. 8,730,523.

(30) Foreign Application Priority Data

May 20, 2010 (JP) .................. 2010-116453

(51) Int. Cl.
  *G06K 15/02* (2006.01)
  *H04N 1/405* (2006.01)
(52) U.S. Cl.
  CPC .......... *G06K 15/1881* (2013.01); *H04N 1/4052* (2013.01)
(58) Field of Classification Search
  CPC .................................................. H04N 1/4052
  USPC ............... 358/3.03, 3.04, 1.16, 515, 534, 1.9
  See application file for complete search history.

(56) References Cited

U.S. PATENT DOCUMENTS 4,722,064 A * 1/1988 Suzuki ................... G06K 15/00
  358/1.15
5,931,960 A * 8/1999 Kletter ................. G09G 3/2059
  358/3.03

(Continued)

FOREIGN PATENT DOCUMENTS

CN 1393093 A 1/2003
CN 101194499 A 6/2008

(Continued)

OTHER PUBLICATIONS

Aug. 16, 2013 Chinese Office Action concerning Chinese Patent Application No. 201110129540.6.

(Continued)

*Primary Examiner* — Tammy Pham
*Assistant Examiner* — Walter Yehl
(74) *Attorney, Agent, or Firm* — Fitzpatrick, Cella, Harper & Scinto

(57) ABSTRACT

An apparatus includes an image processing circuit to perform quantizing processing of image data, which has a plurality of rasters, each of which is formed with a plurality of pixels, by an error diffusion method, to generate print data. The image processing circuit is capable of performing quantizing processing of image data for N colors, and performs the quantizing processing multiple times in image processing of image data for colors more than N colors. In a case when the image processing circuit performs image processing for image data for colors more than the N colors, the image processing circuit repeatedly performs at least first image processing for performing image processing of image data of a first color group and second image processing for performing image processing of image data of a second color group for each band.

15 Claims, 15 Drawing Sheets

(56) References Cited

U.S. PATENT DOCUMENTS

| | | | |
|---|---|---|---|
| 6,559,976 B1* | 5/2003 | Hirota | H04N 1/6072 358/2.1 |
| 7,304,648 B2 | 12/2007 | Beaumont et al. | |
| 7,553,611 B2 | 6/2009 | Chen et al. | |
| 7,884,969 B2 | 2/2011 | Takemura et al. | |
| 7,916,821 B2 | 3/2011 | Li et al. | |
| 7,936,479 B2 | 5/2011 | Bracke et al. | |
| 7,982,273 B2 | 7/2011 | Chen et al. | |
| 8,009,327 B2* | 8/2011 | Ishikawa | H04N 1/4052 358/1.9 |
| 2002/0109869 A1* | 8/2002 | Eisele | G09K 15/02 358/500 |
| 2002/0181003 A1* | 12/2002 | Kakutani | H04N 1/4052 358/1.13 |
| 2005/0260021 A1 | 11/2005 | Abello | |
| 2008/0137145 A1* | 6/2008 | Takemura | H04N 1/4052 358/3.03 |
| 2009/0058903 A1* | 3/2009 | Walmsley | B41J 2/04505 347/9 |
| 2009/0059303 A1* | 3/2009 | Miyazaki | H04N 1/4053 358/3.03 |
| 2010/0169539 A1* | 7/2010 | Ohno | G06T 1/20 711/102 |
| 2012/0170063 A1* | 7/2012 | Takemura | H04N 1/6019 358/1.9 |

FOREIGN PATENT DOCUMENTS

| | | |
|---|---|---|
| CN | 101198909 A | 6/2008 |
| JP | H10-164365 A | 6/1998 |
| JP | 2002-094785 A | 3/2002 |
| JP | 2002-199220 A | 7/2002 |
| JP | 2004-145856 A | 5/2004 |

OTHER PUBLICATIONS

Japanese Office Action dated Nov. 25, 2014, issued in counterpart Japanese Patent Application No. 2014-085938.

Chinese Official Action mailed Apr. 20, 2016, issued in corresponding Chinese Patent Application No. 201410323118.8, with an English translation.

* cited by examiner

FIG.6A

| CURRENT RASTER PROCESSING DIRECTION SIGNAL | |
|---|---|
| 0 | REVERSE DIRECTION |
| 1 | FORWARD DIRECTION |

| FIRST RASTER STAGE SIGNAL | |
|---|---|
| 0 | NOT FIRST RASTER |
| 1 | FIRST RASTER |

| LAST RASTER STAGE SIGNAL | |
|---|---|
| 0 | NOT LAST RASTER |
| 1 | LAST RASTER |

| DATA TRANSFER INITIATING INSTRUCTION SIGNAL | |
|---|---|
| 0 | DATA TRANSFER INITIATING INSTRUCTIONS ABSENT |
| 1 | DATA TRANSFER INITIATING INSTRUCTIONS PRESENT |

| RASTER PROCESSING COMPLETION ACKNOWLEDGE SIGNAL | |
|---|---|
| 0 | NO COMPLETION NOTIFICATION ACKNOWLEDGEMENT ABSENT |
| 1 | COMPLETION NOTIFICATION ACKNOWLEDGEMENT PRESENT |

FIG.6B

| RASTER PROCESSING COMPLETION NOTIFICATION SIGNAL | |
|---|---|
| 0 | RASTER PROCESSING INCOMPLETE |
| 1 | RASTER PROCESSING COMPLETE |

FIG.7A

| ADDRESS RANGE | ACCESS DESTINATION |
|---|---|
| 0x00000000 ~ 0x03FFFFFF (128MByte) | RAM |
| 0xA0000000 ~ 0xA009FFFF (640KByte) | ERROR BUFFER |

FIG.7B

| | |
|---|---|
| IMAGE PROCESSING ACTIVATION REGISTER | 801 |
| BAND MODE REGISTER | 802 |
| PROCESSING MODE REGISTER | 803 |
| RASTER NUMBER REGISTER | 804 |
| LEFTMOST PIXEL COORDINATE REGISTER | 805 |
| RIGHTMOST PIXEL COORDINATE REGISTER | 806 |
| COMMON ORIGIN CORRESPONDING ADDRESS REGISTER | 807 |
| FIRST RASTER ORIGIN CORRESPONDING ADDRESS REGISTER | 808 |
| LAST RASTER ORIGIN CORRESPONDING ADDRESS REGISTER | 809 |

| PROCESSING MODE REGISTER | 3 |
|---|---|
| RASTER NUMBER REGISTER | 64 |
| COMMON ORIGIN CORRESPONDING ADDRESS REGISTER | 0xA000_0000 |
| FIRST RASTER ORIGIN CORRESPONDING ADDRESS REGISTER | 0x0120_0000 |
| LAST RASTER ORIGIN CORRESPONDING ADDRESS REGISTER | 0x0120_0000 |

FIG.15A

| PROCESSING MODE REGISTER | 3 |
|---|---|
| RASTER NUMBER REGISTER | 64 |
| COMMON ORIGIN CORRESPONDING ADDRESS REGISTER | 0xA000_0000 |
| FIRST RASTER ORIGIN CORRESPONDING ADDRESS REGISTER | 0x0130_0000 |
| LAST RASTER ORIGIN CORRESPONDING ADDRESS REGISTER | 0x0130_0000 |

FIG.15B

IMAGE PROCESSING APPARATUS, METHOD, AND STORAGE MEDIUM THAT PERFORM QUANTIZING PROCESSING OF IMAGE DATA FOR AT LEAST N COLORS

CLAIM OF PRIORITY

This application is a continuation of U.S. patent application Ser. No. 13/107,193, filed May 13, 2011, now U.S. Pat. No. 8,730,523.

This application also claims the benefit of Japanese Patent Application No. 2010-116453, filed May 20, 2010, which is hereby incorporated by reference herein in its entirety.

BACKGROUND OF THE INVENTION

1. Field of the Invention

The present invention relates to an image processing apparatus and an image processing method. More particularly, the present invention relates to technology for reducing circuit size and increasing data access speeds when quantizing image data according to error diffusion.

2. Description of the Related Art

Processing by error diffusion is known as a quantization process for converting multi-valued image data into data with a fewer number of gradations, in order to obtain print data used by a printing apparatus. With error diffusion, quantization is performed on one line of pixels arranged in a given direction, in such a manner that quantization is performed from a pixel at one of the ends of the line to the pixel at the other end, in this order. In this case, the error produced by the quantization of each pixel is diffused to pixels on the same line as the target pixel being quantized, as well as to pixels on a line adjacent to that line, in a direction orthogonal to the given direction. When quantization for one line of pixels is finished, similar quantization is performed on the next adjacent line of pixels. In this manner, all lines constituting image data are successively quantized.

With this quantization, the error data diffused to pixels on the same line is, for example, saved in a buffer on a circuit that executes error diffusion until the quantization of those pixels of the line has finished. Also, one line of error data diffused to pixels of an adjacent line is stored in a memory, except for the circuit, and read out from the memory, as pixels on that adjacent line are processed on quantizing for that adjacent line.

In recent printing apparatuses, more types or colors of ink have come to be used, in order to improve color reproducibility. Also, there is a tendency for the image data handled by a printing apparatus to increase in an amount compared to the prior printing apparatus, due to the printed images becoming more detailed, and the printing paper becoming larger in size. For this reason, there is a demand to process large amounts of image data faster, and particularly, there is a demand for faster quantization processing by error diffusion. Furthermore, it is desirable to realize the faster processing without increasing the circuit size and, also, without increasing costs.

Japanese Patent Laid-Open No. H10-164365 (1998) discloses a configuration for executing error diffusion processing wherein the line memory in a circuit for error diffusion processing is a line memory for a number of pixels that is less than one line of pixels. According to this configuration, it becomes possible to easily realize an error diffusion processing circuit as an ASIC and to make error diffusion processing faster.

However, with an error diffusion processing configuration of the prior art, as disclosed in Japanese Patent Laid-Open No. H10-164365 (1998), one line of error data to be diffused to pixels on other lines is written to or read from the memory outside of the error diffusion circuit. For this reason, such a configuration requires a comparatively large amount of time for memory access. More particularly, error data write and read times become even longer in the case when the memory outside of the error diffusion circuit is a memory with comparatively slow operating speeds, such as DRAM. Furthermore, since the data subjected to error diffusion processing increases as factors, such as the types and colors of the ink or other printing materials increase, the amount of error data to be written or read also increases, which further hinders faster error diffusion processing. There is an additional problem in that the circuit size of the error diffusion processing circuit also gets larger as the data subjected to error diffusion processing increases due to increases in factors, such as the types and colors of the printing materials.

SUMMARY OF THE INVENTION

An object of the present invention is to provide an image processing apparatus and an image processing method that enable high speed error diffusion processing without increasing the size of an error diffusion processing circuit.

In a first aspect, the present invention provides an image processing apparatus comprising an image processing circuit for performing processing, in which, after quantization processing of each of the pixels of M-valued image data of a first color (M is an integer greater than 2) by an error diffusion method is performed, to generate N-valued print data (N is an integer greater than 2 and is less than M), quantization processing of each of the pixels of M-valued image data of a second color by an error diffusion method is performed to generate N-valued print data, every one band, which is formed by arranging a predetermined number of rasters, each of which is formed with a plurality of pixels, a first storage unit configured to be able to store error data diffused from a raster to which a pixel subjected to the quantization processing to another raster, the first storage unit being provided outside of the image processing circuit, a second storage unit configured to be able to store error data diffused from a raster to which a pixel subjected to the quantization processing to the other raster, the second storage unit being provided inside of the image processing circuit, a determining unit configured to determine whether or not the raster to which a pixel subjected to the quantization processing belongs to a range of a first raster to an n-th raster (n is the predetermined number) in the band and to determine whether or not the raster to which a pixel subjected to the quantization processing belongs to a range of a last raster to an n-th raster in the band, and an access control unit configured, in a case that the determining unit determines that the raster to which a pixel subjected to the quantization processing belongs to the range of the first raster to the n-th raster, to read the error data stored in the first storage unit as error data to be diffused to the raster, to which a pixel subjected to the quantization processing belongs, and, in a case that the determining unit determines that the raster to which a pixel subjected to the quantization processing does not belong to the range of the first raster to the n-th raster, to read the error data stored in the second storage unit as error data to be diffused to the raster to which a pixel subjected to the quantization processing belongs, and, in a case that the determining unit determines that the raster, to which a pixel subjected to the quantization processing belongs, to the range of the last raster to the n-th raster, to write the error data diffused from the raster to which a pixel subjected to the quantization processing belongs to the first storage unit, and, in a case that the determining unit determines that the raster to which a pixel subjected to the quantization processing does not belong to the range of the last raster to the n-th raster, to write the error data diffused from the raster to which a pixel subjected to the quantization processing belongs to the second storage unit.

In a second aspect, the present invention provides an image processing method using an image processing circuit for performing processing, in which, after quantization processing of each of pixels of M-valued image data of a first color (M is an integer greater than 2) by an error diffusion method is performed to generate N-valued print data (N is an integer greater than 2 and is less than M), quantization processing of each of pixels of M-valued image data of a second color by an error diffusion method is performed, to generate N-valued print data, every one band, which is formed by arranging a predetermined number of rasters, each of which is formed with a plurality of pixels, the method comprising a preparing step of preparing a first storage unit configured to be able to store error data diffused from raster to which a pixel subjected to the quantization processing, to the other raster, the first storage unit being provided outside of the image processing circuit, and a second storage unit configured to be able to store error data diffused from a raster to which a pixel subjected to the quantization processing, to the other raster, the first storage unit being provided inside the image processing circuit, a determining step of determining whether or not the raster, to which a pixel subjected to the quantization processing belongs to a range of the first raster to the n-th raster (n is the predetermined number) in the band and to determine whether or not the raster to which a pixel, subjected to the quantization processing belongs to a range of the last raster to the n-th raster in the band, and an access control step of, in a case that the determining step determines that the raster, to which a pixel subjected to the quantization processing belongs to the range of the first raster to the n-th raster, reading the error data stored in the first storage unit as error data to be diffused to the raster, to which a pixel subjected to the quantization processing belongs, and, in a case that the determining step determines that the raster to which a pixel subjected to the quantization processing does not belong to the range of the first raster to the n-th raster, reading the error data stored in the second storage unit as error data to be diffused to the raster, to which a pixel subjected to the quantization processing belongs, and, in a case that the determining step determines that the raster to which a pixel subjected to the quantization processing belongs to the range of the last raster to the n-th raster, writing the error data diffused from the raster, to which a pixel subjected to the quantization processing belongs to the first storage unit, and, in a case that the determining step determines that the raster to which a pixel subjected to the quantization processing does not belong to the range of the last raster to the n-th raster, writing the error data diffused from the raster, to which a pixel subjected to the quantization processing belongs to the second storage unit.

According to the above configurations, high speed error diffusion processing can be performed without increasing the size of an error diffusion processing circuit, even in the case when a large amount of print data, such as print data of twelve colors is generated.

Further features of the present invention will become apparent from the following description of exemplary embodiments (with reference to the attached drawings).

BRIEF DESCRIPTION OF THE DRAWINGS

FIGS. 6A and 6B are diagrams explaining respective signals in the image processing unit illustrated in FIG. 5;

FIG. 7A is a diagram explaining access destinations of the respective DMACs illustrated in FIG. 5, and FIG. 7B is a diagram explaining the respective registers illustrated in FIG. 5;

FIGS. 15A and 15B are diagrams explaining exemplary register settings in the case of quantizing 12-color image data in the image processing circuit illustrated in FIG. 5.

DESCRIPTION OF THE EMBODIMENTS

Hereafter, embodiments of the present invention will be described in detail, and with reference to the drawings.

Figure 1:
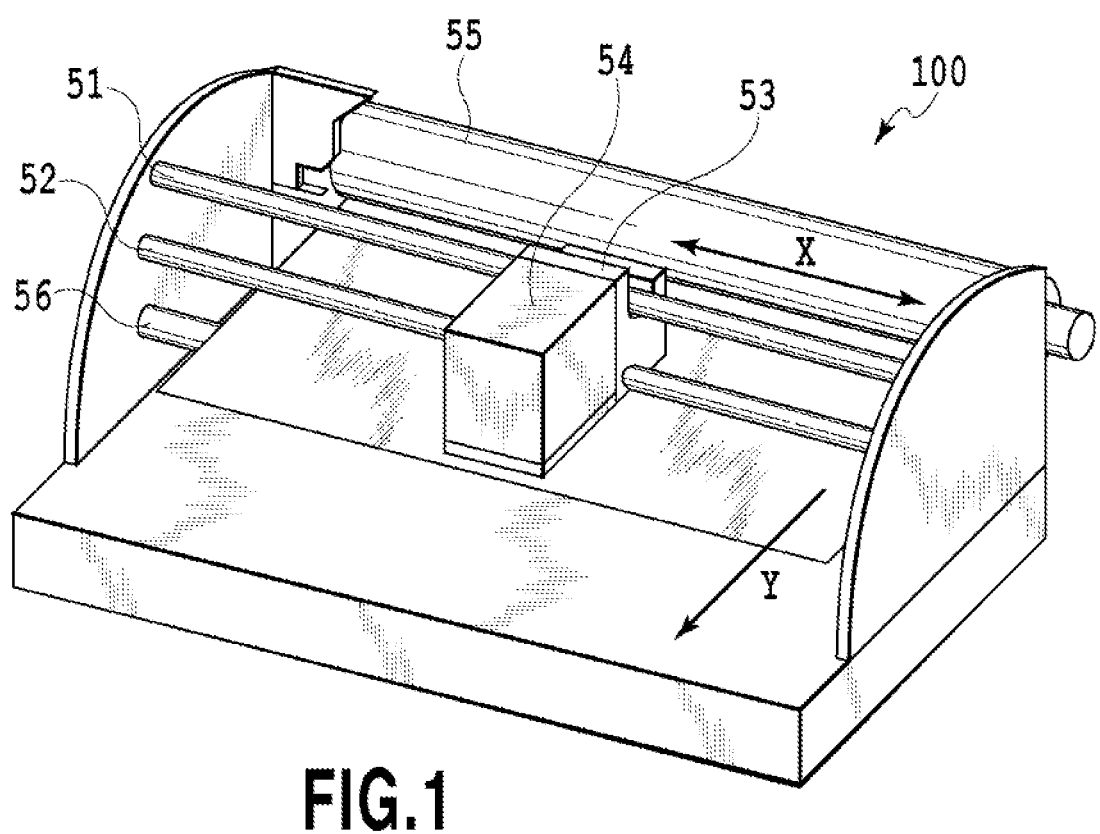
FIG. 1 is a perspective view illustrating a schematic configuration of an inkjet printing apparatus in accordance with an embodiment of the present invention.

FIG. 1 is a perspective view illustrating a schematic configuration of an inkjet printing apparatus in accordance with an embodiment of the present invention. In FIG. 1, a printing apparatus 100 is provided with a carriage 53. The carriage 53 is guided by guide rails 51 and 52, and is provided so as to be movable in a scan direction indicated by the arrow X in FIG. 1 (the main scan direction). A print head 54 is removably mounted onto the carriage 53. In addition, the carriage 53 performs the above movement by a driving force of a carriage motor (not illustrated) being transmitted by an endless belt or another driving force transmission mechanism (not illustrated). As a result, scanning of the print head with respect to a printing medium becomes possible Ink is supplied to the print head 54 mounted on the carriage 53 via tubes from ink tanks (not illustrated) that house ink of respective colors.

The print head 54 of the present embodiment is provided with nozzle arrays, in which nozzles capable of ejecting ink are arrayed in a direction intersecting the scan direction. Nozzle arrays are provided for twelve colors of inks as follows. In other words, the print head 54 is provided nozzle arrays for ejecting cyan (C), photo cyan (light cyan; LC), magenta (M), photo magenta (light magenta; LM), yellow (Y), red (Red), green (Gr), blue (Bl), black (K), matte black (MK), gray (Gry), and photo gray (light gray; LGry) inks. An element, such as an electrothermal converter (heater), or a piezo element utilizing the piezoelectric effect may be used as the mechanism for ejecting ink from each nozzle. In the case of using an electrothermal converter, ink is made to form a bubble by the heat generated from the electrothermal converter, and the bubble energy produced during bubble formation is utilized to eject ink from an ejection port.

For the paper used as a printing medium, roll paper 55 wound into a roll is fitted in the printing apparatus 100, and a sheet edge pulled from the roll paper 55 is inserted into an insertion port. A sheet is transported by a feed roller 56 in a transport direction indicated by the arrow Y in FIG. 1 that is orthogonal to the main scan direction (the sub-scan direction). Images are successively printed onto a printing medium by repeating print operations that eject ink in accordance with print data from respective nozzles during scans of the print head 54, and transport operations that transport a printing medium in the transport direction by a distance corresponding to a printing width given by a scan of the print head 54. In the present embodiment, it is possible to print a maximum width of sixty inches with a scan of the print head.

Figure 2:
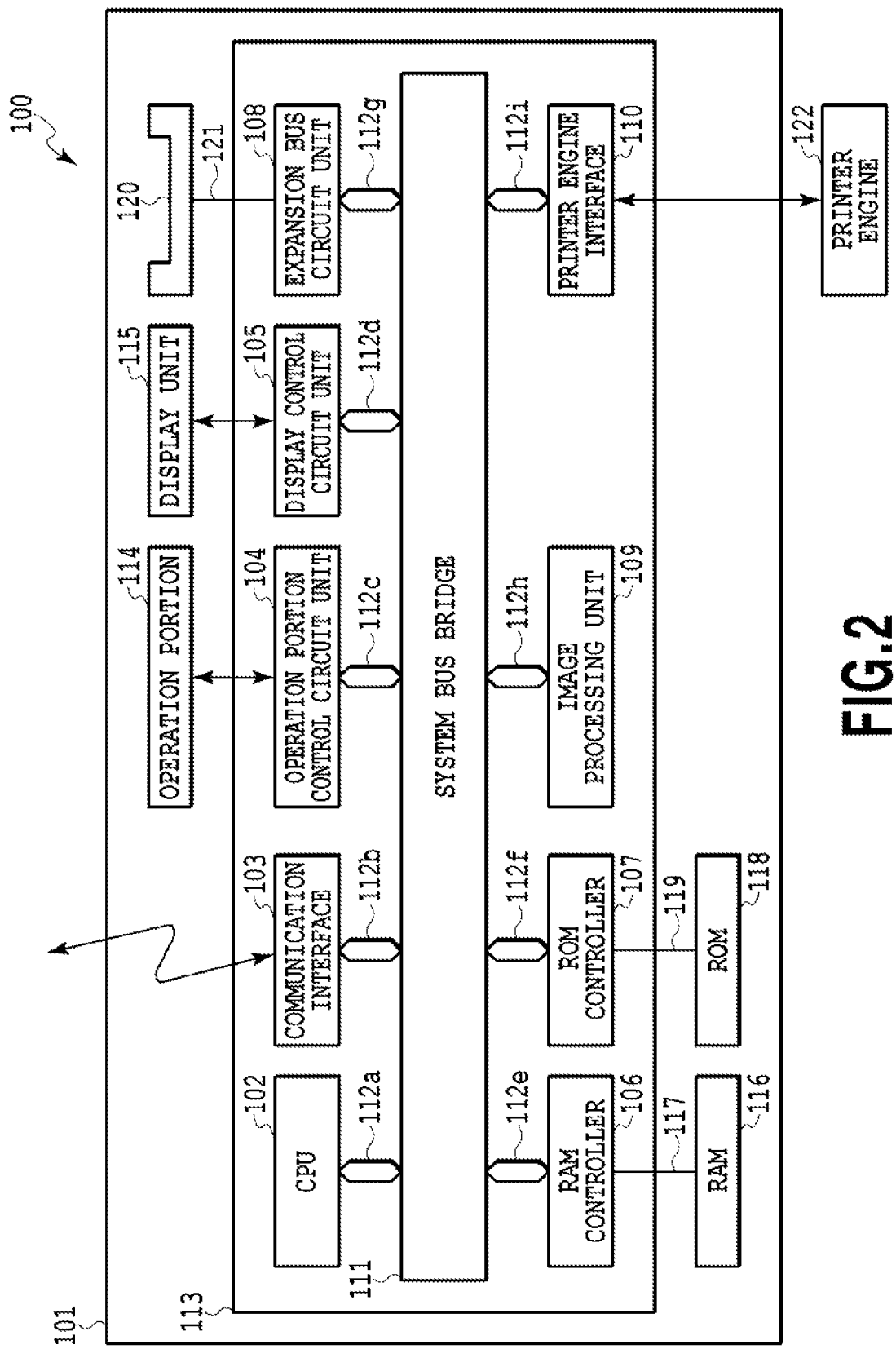
FIG. 2 is a block diagram illustrating a control and data processing configuration of the printing apparatus in accordance with the present embodiment illustrated in FIG. 1.

FIG. 2 is a block diagram illustrating a control and data processing configuration of the printing apparatus in accordance with the present embodiment illustrated in FIG. 1. As illustrated in FIG. 2, a printing apparatus of the present embodiment is configured to include an image formation controller 101 that executes control and data processing, a printer engine 122 given by the printing mechanism primarily illustrated in FIG. 1, and elements such as an electrical circuit (not illustrated).

The image formation controller 101 receives printing instructions and image data for printing from a host apparatus, such as a personal computer, converts the received image data into binary print data used by the printer engine 122, and outputs the converted data. As illustrated in FIG. 2, the image formation controller 101 includes a CPU 102, a communication interface 103, an operation portion control circuit 104, a display control circuit 105, a RAM controller 106, a ROM controller 107, and an expansion bus circuit 108. Also, the image formation controller 101 is provided with an image processing unit 109 and a printer engine interface 110. Each of these blocks described above is coupled to a system bus bridge 111 via respective bus lines 112a to 112i. In the present embodiment, each of these units is realized as an image formation controller application-specific integrated controller (ASIC) 113 sealed in a single package as a system LSI. The image formation controller 101 is further provided with an operation portion 114, a display unit 115, a RAM 116, a ROM 118, and an expansion slot 120, into which a function expansion unit is loaded.

The CPU 102 administers overall control of the image formation controller 101. The CPU 102 controls the communication interface 103, the operation portion 114, and the display unit 115, by successively reading out and executing control steps stored in the ROM 118 or the RAM 116. The CPU 102 also controls the image processing unit 109 in order to convert received image data into image formation data, and controls the printer engine interface 110 in order to transfer generated image formation data to the printer engine 122, for example.

The communication interface 103 sends and receives data to and from a host apparatus, such as a personal computer or a workstation, and stores image data received from a host apparatus in the RAM 116 via the RAM controller 106. An established protocol, such as Universal Serial Bus (USB), may be used as the communication protocol of the communication interface 103. The operation portion control circuit 104 issues notifications regarding the states of electrical signals output from switches constituting the operation portion 114 as register information with respect to read commands from the CPU 102. The display control circuit 105 outputs electrical signals to a liquid crystal display (LCD) apparatus and LED lamps constituting the display unit 115.

The RAM controller 106 controls the RAM 116 coupled to the image formation controller ASIC 113 via a RAM bus 117. In other words, the RAM controller 106 generates necessary control signals in response to read requests and write requests from the CPU 102 and respective units, and realizes writes to the RAM 116 and reads from the RAM 116. The ROM controller 107 controls the ROM 118 coupled to the image formation controller ASIC 113 via a ROM bus 119. In other words, the ROM controller 107 generates necessary control signals in response to read requests from the CPU 102, reads out control steps and data stored in advance in the ROM 118, and sends back the read-out content to the CPU 102 via the system bus bridge 111. Also, in the case when the ROM 118 is realized as an electrically rewritable device, such as a flash memory, the ROM controller 107 generates necessary control signals, and rewrites the content of the ROM 118.

The expansion bus circuit 108 controls the function expansion unit fitted in the expansion slot 120, and controls both the transmission of data to the function expansion unit via the expansion bus 121, as well as the receiving of data output by the function expansion bus. The expansion slot 120 is equipped with a hard disk drive that provides high volume storage functions, or a communication unit that communicates with a host apparatus by means of communication functions conforming to a standard such as USB, IEEE 1394, or IEEE 1284, for example.

The image processing unit 109 converts image data received from a host apparatus into binary print data printable by the printer engine 122. Herein, a detailed configuration of the image processing unit 109 will be described later using FIG. 5.

The printer engine interface 110 sends and receives data to and from the image formation controller 101 and the printer engine 122. The printer engine interface 110 includes a direct memory access controller (DMAC). Consequently, the printer engine interface 110 is able to successively read out transfer binary print data generated by the image processing unit 109 and stored in the RAM 116 via the RAM controller 106, and to transfer read-out data to the printer engine 122. Herein, the image processing unit 109, the communication interface 103, and the expansion bus circuit 108 include DMAC functions similar to the printer engine interface 110, and are able to issue memory access requests.

Besides being provided with functions for coupling together the respective units constituting the image formation controller ASIC 113, the system bus bridge 111 is provided with functions for mediating bus rights in the case when access requests are contemporaneously issued from a plurality of blocks. In some cases, the CPU 102 and the respective DMAC-equipped blocks issue access requests to access the RAM 116 via the RAM controller 106 at approximately the same time, and the system bus bridge 111 is able to suitably mediate such access requests in accordance with pre-specified priorities.

The operation portion 114 includes switches linked to buttons that set the operation of the printing apparatus 100, and outputs the states of these switches as electrical signals. The operation portion 114 is provided with a power button that instructs the printing apparatus 100 to power on or power off. The operation portion 114 is also provided with an online button that switches the operational mode, a menu button that instructs the printing apparatus 100 to display a menu screen, a 4-way directional button for selecting items from the menu screen, and an OK button that confirms a selected item. Besides the above, the operation portion 114 is provided with a stop button that instructs the printing apparatus 100 to stop printing, and a feed selection button that selects the printing paper feed method. The display unit 115 includes components, such as an LCD apparatus, and one or more LED lamps. Besides displaying the operational state of the printing apparatus 100, the LCD apparatus is able to display a menu screen in response to operation of the menu button of the operation portion 114, for example. The one or more LED lamps indicate the operational state of the printing apparatus 100 and indicate warnings.

The RAM 116 is realized by an SDRAM, for example, and is a memory that stores control steps executed by the CPU 102, temporarily stores image data generated by the image processing unit 109, and provides functions such as work memory for the CPU 102. The ROM 118 is realized by a flash memory, for example, and stores control steps executed by the CPU 102, as well as parameters necessary for printer control.

The printer engine 122 is a printing mechanism for printing images onto a printing medium on the basis of binary print data sent from the image formation controller 101. In the present embodiment, the printer engine 122 is a mechanism that forms images onto a printing medium by means of an inkjet print head, as described earlier using FIG. 1, and is able to print images with a maximum width of sixty inches at a resolution of 2400 dpi in the main scan direction using twelve colors of inks.

Figure 3A:
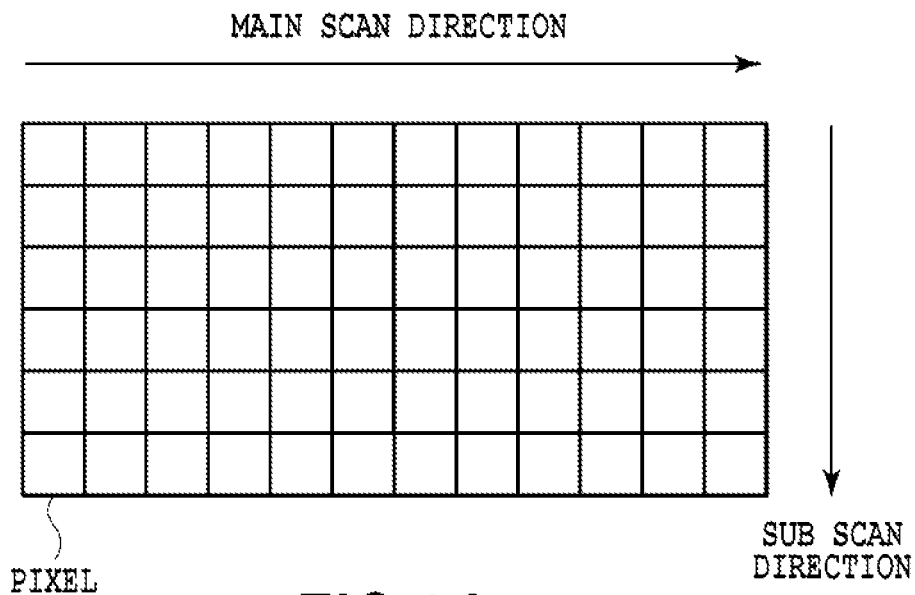
FIGS. 3A to 3C are diagrams explaining pixels in image data processed by the image processing unit illustrated in FIG. 2.
Figure 3B:
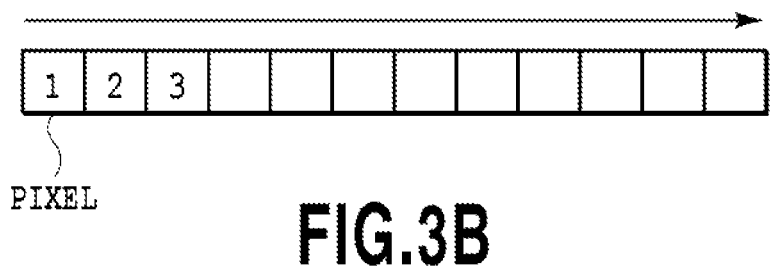
Figure 3C:
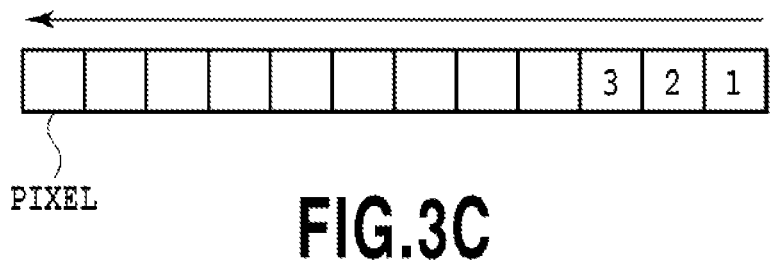

FIGS. 3A to 3C are diagrams explaining pixels in image data processed by the image processing unit 109. In FIG. 3A, each small square represents a single pixel. Image data of each color to be processed by the image processing unit 109 is expressed by a density value that is associated with individual pixels respectively arrayed in the main scan direction and the sub scan direction. A row made up of a series of pixels lined up in the main scan direction is called a raster, while a rectangular pixel group having a given number of rasters with the same pixel counts arrayed therein is called a band. Herein, the number of rasters constituting a band and the number of pixels constituting a raster may be one or a plurality.

The image processing unit 109 performs image processing on each raster in a band, in order, from the first raster in the sub scan direction. Also, for a single raster, pixels are processed one at a time, in order, from the left end to the right end, or from the right end to the left end. FIGS. 3B and 3C are diagrams illustrating processing directions with respect to a single raster, with the numbers in the figures indicating the processing order for each pixel. In the case of forward direction processing, pixels are processed in order from the left end to the right end, as in FIG. 3B. In the case of reverse direction processing, pixels are processed in order from the right end to the left end, as in FIG. 3C.

Figure 4A:
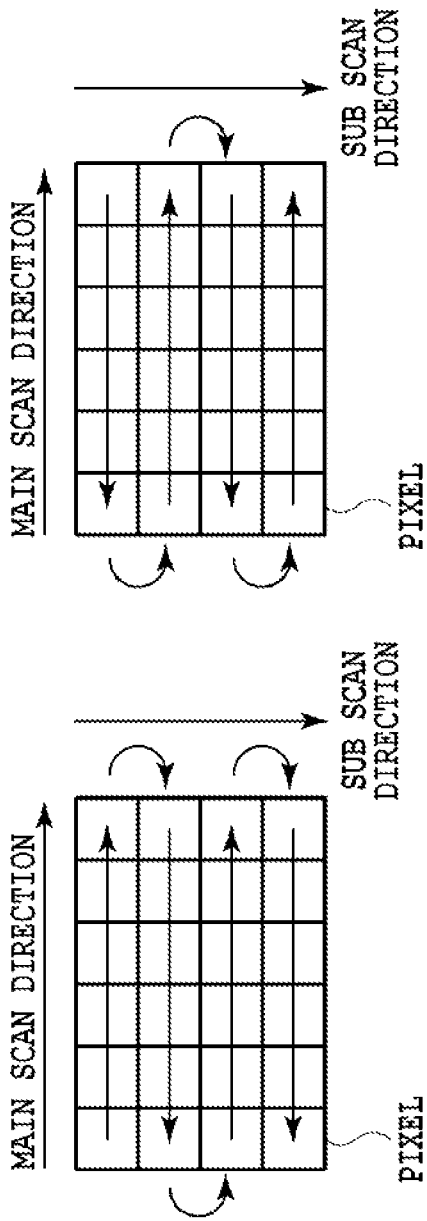
FIGS. 4A and 4B are diagrams explaining band modes for image data processed by the image processing unit illustrated in FIG. 2.
Figure 4B:
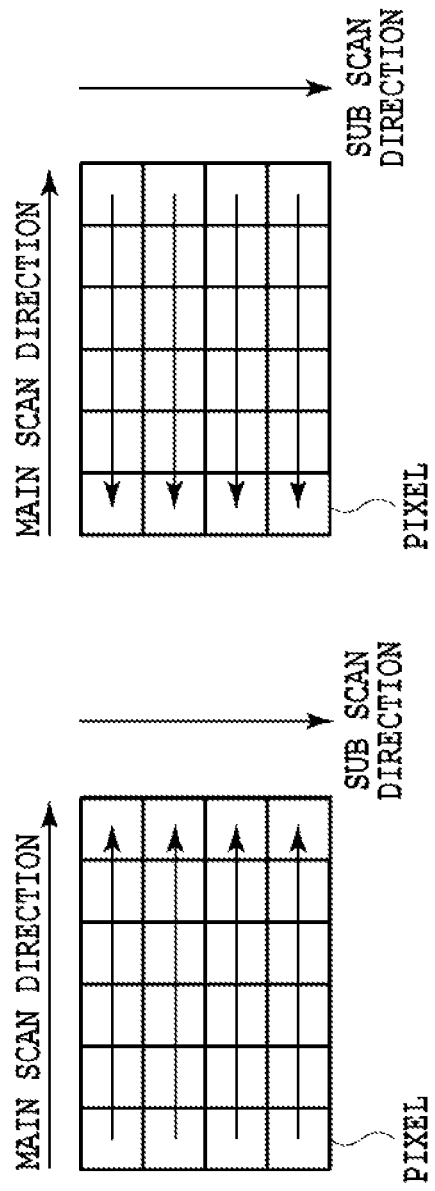

An image processing unit of the present embodiment can select and execute between two direction processing and one direction processing for processing a band. FIGS. 4A and 4B illustrate examples of the band, in which one band is made up of four rasters. Each raster shown in FIGS. 4A and 4B is made up of six pixels. With two direction processing, image processing is executed while switching between forward direction processing and reverse direction processing for each raster, as illustrated in FIG. 4A. With one direction processing, all rasters constituting the band are processed in the same direction, as illustrated in FIG. 4B. Meanwhile, image processing starting with reverse direction processing can be initiated in the case of either two direction processing or one direction processing.

In the present embodiment, the coordinates of pixels constituting an image, as described above, are specified in correspondence with a printing area on a printing medium. With a printing apparatus of the present embodiment, the maximum width of the printing area in the main scan direction is sixty inches, as described earlier. In the case of a printing area with this maximum width, the printing pixels have a resolution of 2400 dpi, which gives a pixel count of 144000. In contrast, the resolution of image data processed by the image processing unit 109 is 1200 dpi from its relationship with the 2×2 pixel dot arrangement patterns obtained by a binarization processing circuit in accordance with index data. Consequently, the pixel count of a single raster in image data becomes a maximum of 72000 for a printing area of the above width, and the pixel coordinates becomes 0 to 71999, in order, from the pixel on the left side of FIG. 3A. The printing position on a printing medium of a band to be processed can be specified by specifying the respective pixel coordinates of the leftmost pixel and the rightmost pixel of the band. For example, if 18000 and 35999 are, respectively, specified as the leftmost pixel coordinate and the rightmost pixel coordinate of the band to be processed, an image in this band will be printed in a range from ¼ of the sheet width from the left end of the printing sheet to the sheet center.

As described later, the RAM 116 is prepared as a first storage memory, and an error buffer in the image processing unit 109 is prepared as a second storage memory, and image data handled by the image processing unit 109 and error data in error diffusion processing is stored in these memories. The positions in the memory where image data and error data are stored can be computed from the memory address where the data corresponding to the pixel coordinate zero should be stored, the leftmost pixel coordinate, and the rightmost pixel coordinate. This memory address where the data corresponding to the pixel coordinate zero should be stored is called the origin corresponding address.

Figure 5:
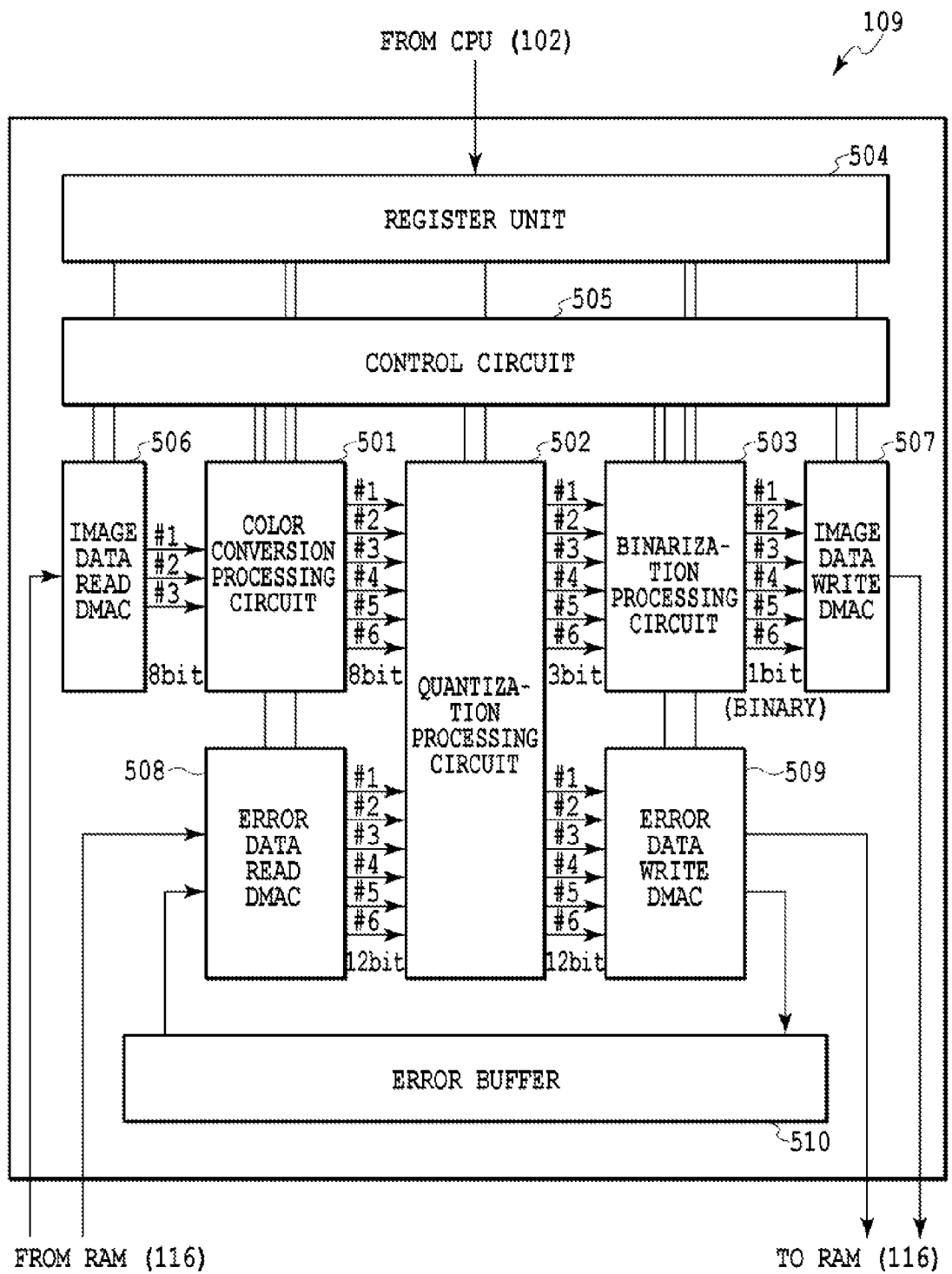
FIG. 5 is a block diagram explaining a function block configuration of the image processing unit illustrated in FIG. 2 and a format of image data to be processed.

FIG. 5 is diagram explaining a function block configuration of an image processing unit 109 and a format of image data to be processed.

As illustrated in FIG. 5, the image processing unit 109 is configured to include a color conversion processing circuit 501, a quantization processing circuit 502, a binarization processing circuit 503, a register unit 504, a control circuit 505, and an error buffer 510. In the present embodiment, the error buffer 510 is realized by SRAM. In addition, the image processing unit 109 includes an image data read DMAC 506 and an error data read DMAC 508, which read out image data and error data, and an image data write DMAC 507 and an error data write DMAC 509, which write the respective data. An image processing unit 109 of the present embodiment that includes the above configuration is realized as a circuit constituting a part of an ASIC 113, as described earlier. Furthermore, the image processing unit 109 is a circuit that processes a maximum of six-color image data with respect to the colors of inks used by the printer engine 122. In other words, the processing of the color conversion processing circuit 501, quantization processing circuit 502, and binarization processing circuit 503 described hereafter is respectively executed twice for the same pixel (the target pixel subject being processed). Thereby, the circuit size of the image processing unit 109, and, by extension, the circuit size of the ASIC 113 that includes this processor, can be made smaller.

More specifically, the color conversion processing circuit 501 performs color correction processing and color space conversion processing on image data from a host apparatus made up of color signals wherein red (R), green (G), and blue (B) are respectively expressed with eight bits (a value from 0 to 255). With color correction processing, gamma correction processing is performed on the color signals R, G, and B by performing interpolation computations in conjunction with one-dimensional lookup tables corresponding to the respective color signals. Next, with color space conversion processing, a three-dimensional lookup table obtained from the combination of R, G, and B is referenced, and interpolation processing is performed in conjunction with the reference results to convert the color signals R, G, and B into six-color ink color signals C, LC, M, LM, Y, and Red, as a first process. These ink color signals are respectively expressed by eight bits, with each taking any value between 0 and 255.

The quantization processing circuit 502 performs quantization processing by one pixel for each of six color signals. The quantization processing is performed by using the error diffusion. The quantization processing circuit 502 outputs three-bit, five-valued index data expressing any gradation level between 0 and 4. The binarization processing circuit 503 then applies a dot arrangement pattern corresponding to the index data, and outputs one-bit, two-valued print data (image data).

With the second process, with respect to the image data of a target pixel, first, the color correction processing (of the color conversion processing circuit 501) is performed on the color signals R, G, and B that constitute the same image data of the target pixel. The processing results are the same as the first time, and with the color space conversion processing of the color conversion processing circuit 501, conversion is performed on the basis of the same resulting color signals R, G, and B. In other words, a three-dimensional lookup table is referenced by the combination of R, G, and B, and the interpolation computation is used in combination to convert the same resulting color-corrected color signals R, G, and B into the ink color signals Gr, Bl, K, MK, Gry, and LGry in accordance with the second process. Next, in the quantization processing circuit 502, the above color signals Br, Bl, K, MK, Gry, and LGry are respectively quantized by error diffusion, the details of which will be later described, and five-value index data for each ink color is output. A dot arrangement pattern corresponding to the index data is then used by the binarization processing circuit 503 to output binary print data. The RAM 116 as the first storage memory has an area allocated for storing error data of twelve colors that is generated during the quantization processing. The error buffer 510 as the second storage memory in the image processing unit 109 has an area allocated for storing error data of six colors that is generated during the quantization processing. The areas allocated in the error buffer 510 are as follows. For example, the area storing the error data of C signal in the first processing corresponds to the area storing the error data of Gr signal in the second processing. The area storing the error data of LC signal in the first processing corresponds to the area storing the error data of Bl signal in the second processing. The area storing the error data of M signal in the first processing corresponds to the area storing the error data of K signal in the second processing. The area storing the error data of LM signal in the first processing corresponds to the area storing the error data of MK signal in the second processing. The area storing the error data of Y signal in the first processing corresponds to the area storing the error data of Gry signal in the second processing. The area storing the error data of Red signal in the first processing corresponds to the area storing the error data of LGry signal in the second processing.

In this way, the present embodiment is configured to repeat the same image processing twice to generate print data made up of twelve-color ink color signals. Thereby, the circuit size for image processing can be made smaller.

Herein, in the present embodiment, the image data used in image processing is taken to be made up of three-color RGB color signals, but an embodiment is obviously not limited to this configuration. For example, the image data may be made up of color signals for the four colors cyan (C), magenta (M), yellow (Y), and black (K). Also, although the ink color signals were taken to have a maximum of twelve colors, and the image processing circuit size was correspondingly taken to be able to execute processing for a maximum of six colors, an embodiment is obviously not limited to this configuration. An image processing circuit may be made to perform a number of processes that matches the maximum number of ink color signals to be used divided into two or an even greater number of divisions.

In FIG. 5, the register unit 504 is made by a register group provided with registers, such as an image processing activation register that instructs initiation of image processing, and a command parameter register that specifies details and parameters for image processing to be executed. The register unit 504 also includes a register for setting parameters related to error data access when processing the first raster and the last raster of a band. These parameters are set based on the instructions from CPU 102. The control circuit 505 controls the image processing unit 109 overall. For example, the control circuit 505 may operate according to activation instructions from the CPU 102, and output necessary control signals to the respective function blocks and DMACs in the image processing unit 109, in accordance with parameters set in the register unit.

The control circuit 505 also outputs the respective control signals illustrated in FIG. 6A, as well as control signals not illustrated. In FIG. 6A, the "current raster processing direction signal" is a signal indicating whether the processing direction of the raster being processed is the forward direction or the reverse direction, with the signal outputting "1" in the case of the forward direction, and "0" in the case of the reverse direction. The "first raster stage signal" is a signal indicating whether or not the raster being processed is the first raster of a band, with the signal outputting "1" in the case of the first raster. The "last raster stage signal" is a signal indicating whether or not the raster being processed is the last raster of a band, with the signal outputting "1" in the case of the last raster. The "data transfer initiating instruction signal" is a signal that instructs each DMAC (506 to 509) to initiate data transfer by performing image data and error data reads or writes, with the signal instructing transfer initiation by outputting "1". Lastly, the "raster processing completion acknowledge signal" is an acknowledgement signal returned in response to a raster processing completion notification output from each DMAC, with the signal acknowledging a notification by outputting "1".

The image data read DMAC 506 is a DMAC for reading out input image data stored in the RAM 116. Also, the image data write DMAC 507 is a DMAC for storing generated binary image data (print data) in the RAM 116. The image processing unit 109 receives instructions of areas in the RAM 116, which the image data read DMAC 506 and the image data write DMAC 507 access, respectively, from CPU 102. The register unit 504 also includes a register holding parameters corresponding to the above instructions.

The error data read DMAC 508 is a DMAC for reading out error data diffused from an adjacent line. More specifically, in accordance with a signal from the control circuit 505, the error data read DMAC 508 selects either the RAM 116 or the error buffer 510, and reads out error data corresponding to pixels involved in processing from among one line of error data stored therein for each color. On the other hand, the error data write DMAC 509 is a DMAC for writing error data. More specifically, in accordance with a signal from the control circuit 505, the error data write DMAC 509 selects either the RAM 116 or the error buffer 510, and write (store) error data thereto by one pixel. The error data read DMAC 508 and the error data write DMAC 509 perform the respective processing described above for one line of error data.

More specifically, the error data read DMAC 508 and the error data write DMAC 509 control access to the RAM 116 in the case when the address of the memory to be accessed in the range from 0x00000000 to 0x03FFFFFF, as illustrated in FIG. 7A. Likewise, the error data read DMAC 508 and the error data write DMAC 509 control access to the error buffer 510 in the case when the address of the memory to be accessed is in the range from 0xA0000000 to 0xA009FFFF. Also, when the transfer of one raster's worth of data is finished, each DMAC (506 to 509 outputs to the control circuit 505 a "raster processing completion notification signal", as illustrated in FIG. 6B.

As illustrated in FIG. 7B, the register unit 504 is configured to include an image processing activation register 801 that instructs initiation of image processing, and respective registers for setting parameters that stipulate the operational mode of the quantization processing circuit 502. The register unit 504 is also provided with a register group (not illustrated) that sets the operational modes for color conversion processing and binarization processing. Parameters related to the operational mode of the quantization processing circuit 502 are respectively set in a band mode register 802, a processing mode register 803, and a raster number register 804. Additionally, the register unit 504 is provided with a leftmost pixel coordinate register 805, a rightmost pixel coordinate register 806, a common origin corresponding address register 807, a first raster origin corresponding address register 808, and a last raster origin corresponding address register 809.

Figure 8A:
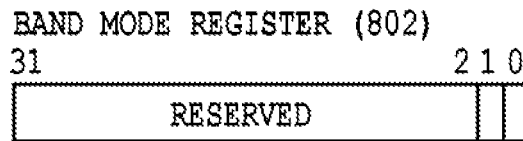
FIGS. 8A and 8B are diagrams explaining a band mode register field and a processing mode register field for the registers illustrated in FIG. 7B.
Figure 8B:
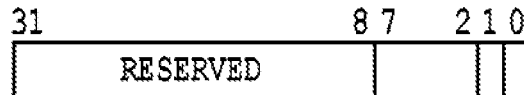

As illustrated in FIG. 8A, the band mode register 802 is provided with a field that specifies the band processing mode and a field that specifies the processing direction of the first raster. Also, as illustrated in FIG. 8B, the processing mode register 803 for performing access setting is provided with a field as a bit "0" that specifies the address for storing error data. When the value of bit "0" is "1", the address stored in the first raster origin corresponding address register 808 is specified. When the value of bit "0" is "0", the address stored in the common origin corresponding address register 807 is specified. The processing mode register 803 is provided with a field as a bit "1" that specifies the address for storing error data. When the value of bit "1" is "1", the address stored in the last raster origin corresponding address register 809 is specified. When the value of bit "1" is "0", the address stored in the common origin corresponding address register 807 is specified. The processing mode register 803 is also provided with a field that set other operational modes. The content set in each of these registers is supplied to the respective units in the image processing unit 109 as register setting value signals, and can be referenced by respective units.

A quantization process using error diffusion executed by an image processing unit 109 having the above configuration will now be primarily described below. First, the quantization processing circuit 502 of the image processing unit 109 reads out error data diffused from the raster preceding the raster that includes the target pixel (hereafter referred to as the preceding raster). The read-out error data is then added to the image data of the target pixel output from the color conversion processing circuit 501. That is, an error value expressed by the error data is added to the gradation value of the image data of the target pixel. Error data diffused from the preceding raster is stored in the error buffer 510 or RAM 116 capable of storing this data. Then, as described later, error data is read out from the error buffer 510 or the RAM 116 according to the raster to which the target pixel belongs, on the basis of control by the error data read DMAC 508, which performs access control. Also, the quantization processing circuit 502 adds to the image data of the target pixel error data diffused from pixels already subjected to quantization processing on the same raster as the raster that includes the target pixel (hereinafter referred to as the same raster). Error data to be diffused from pixels on the same raster is temporarily stored in a buffer (not shown) in the quantization processing circuit 502.

The quantization processing circuit 502 quantizes the image data of the target pixel, to which error data from pixels on the same raster and the preceding raster has been added as above, by comparing the individual color signals of the image data of the target pixel with a threshold value, and obtains index data. The index data is sent to the binarization processing circuit 503 and converted to binary print data, and is stored in the RAM 116 by the image data write DMAC 507. Also, error produced during quantization is diffused to given pixels on the same raster and an adjacent raster.

Figure 9:
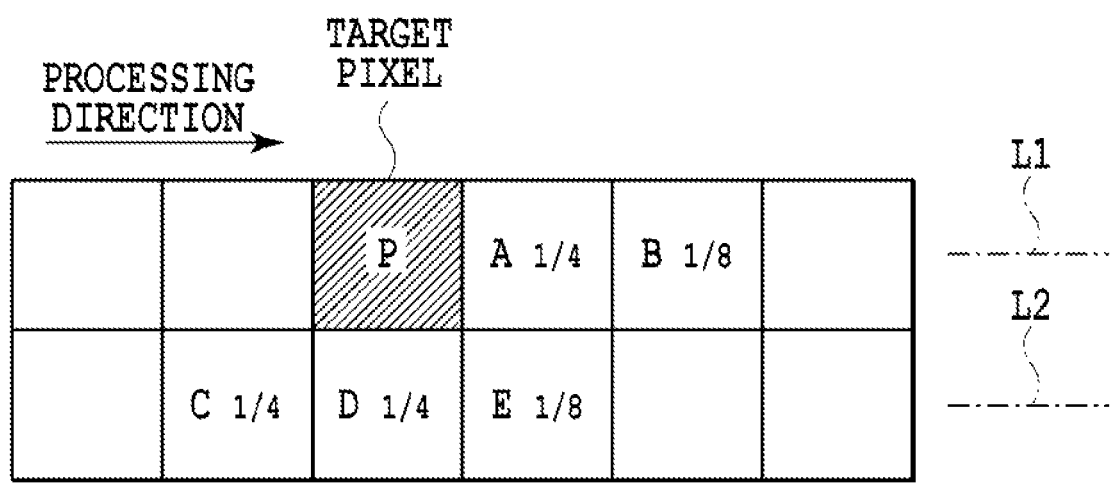
FIG. 9 is a diagram explaining the diffusion of quantization error produced by a comparison with a threshold value in an embodiment of the present invention.

FIG. 9 is a diagram explaining the diffusion of quantization error produced by comparison with a threshold value described above. In FIG. 9, error produced by quantizing of target pixel "P" is diffused to surrounding unprocessed pixels in accordance with diffusion coefficients illustrated in FIG. 9. More specifically, error data diffused to pixels A and B on the same raster L1 as the target pixel P is saved in a buffer (not shown) in the quantization processing circuit 502. Also, error data diffused to pixels C, D, and E on an adjacent raster L2 is temporarily stored in a buffer in the quantization processing circuit 502, and then, all error data to be diffused to the same pixel is aggregated. Combined error data is stored in the error buffer 510 or the RAM 116 according to the raster to which the target pixel belongs, and through the error data write DMAC 509, as the details of which will be later described.

Figure 10A:
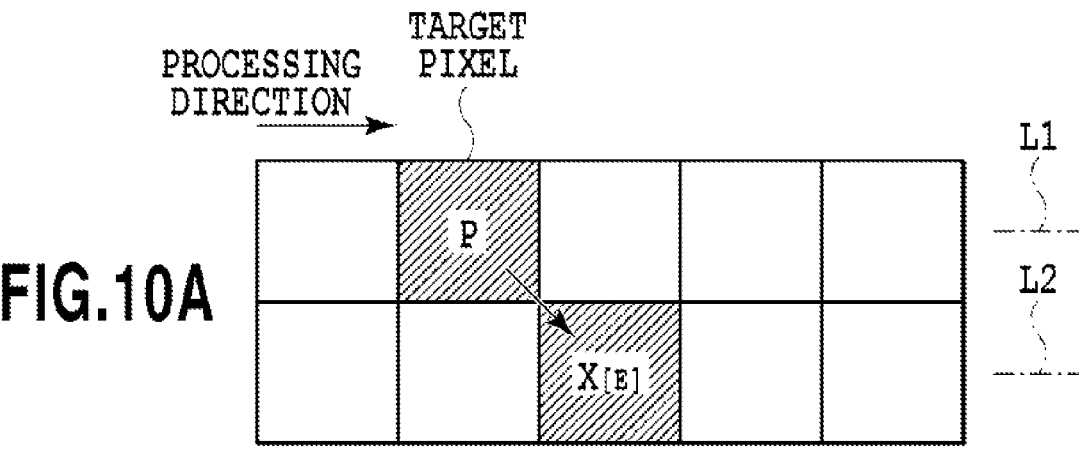
FIGS. 10A, 10B, and 10C are diagrams explaining diffusion to an adjacent raster in the above quantization error diffusion.
Figure 10B:
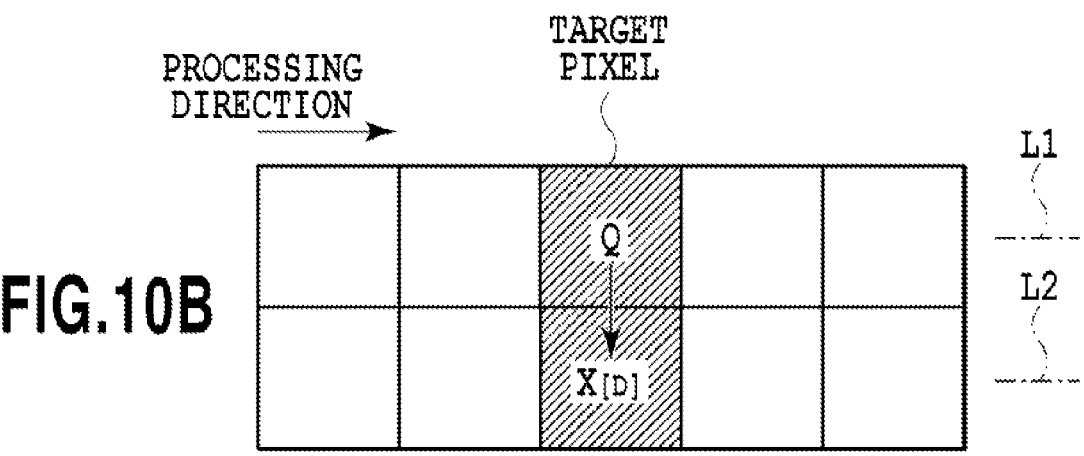
Figure 10C:
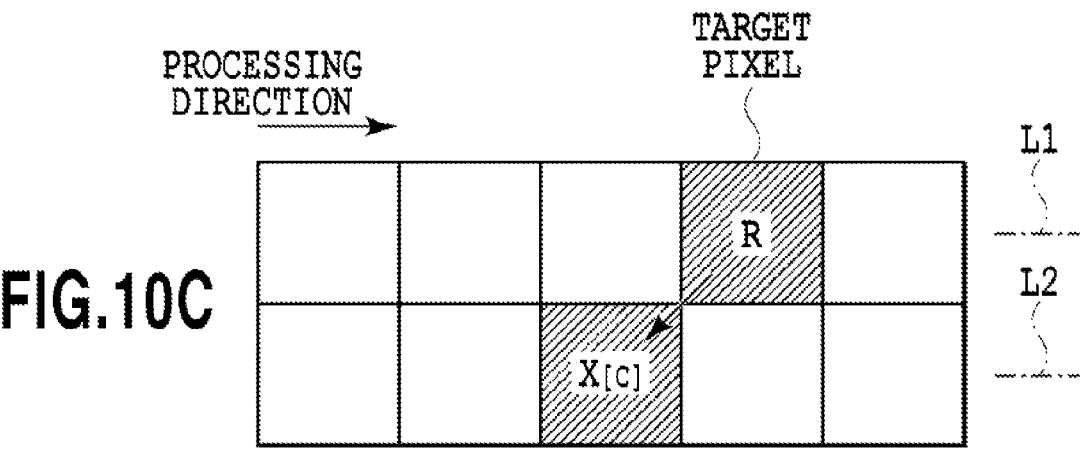

As illustrated in FIG. 10A, error data to be diffused from a target pixel P to a pixel X on an adjacent raster L2 is the combined sum of the following first, second, and third error data. The first error data is error data diffused from a target pixel "P" illustrated in FIG. 10A, in accordance with the diffusion coefficient (⅛) of the pixel E illustrated in FIG. 9. The second error data is error data diffused from a target pixel "Q" shown in FIG. 10B, in accordance with the diffusion coefficient (¼) of the pixel D illustrated in FIG. 9. The third error data is error data diffused from a target pixel "R" shown in FIG. 10C, in accordance with the diffusion coefficient (¼) of the pixel C illustrated in FIG. 9.

Upon being instructed to initiate image processing as a result of the CPU 102 writing control parameters to the color conversion processing circuit 501, the image processing unit 109 successively reads out input image data stored in the RAM 116 from the pixel at one end of a raster to the pixel at the other end, and performs color conversion processing, quantization processing, and binarization processing. The image processing unit 109 repeats this series of processes (also called "raster processes"), and when processing is finished for a set raster number, the image processing unit 109 issues an interrupt and notifies the CPU 102 that band processing is complete. All image data is binarized by similarly processing unprocessed bands existing in the sub scan direction according to instructions from the CPU 102. Binarized image data (print data) is successively stored in the RAM 116, and an image is printed onto a printing medium on the basis of this print data, as a result of the print data being sent to the printer engine 122 through the printer engine interface 110.

Figure 11:
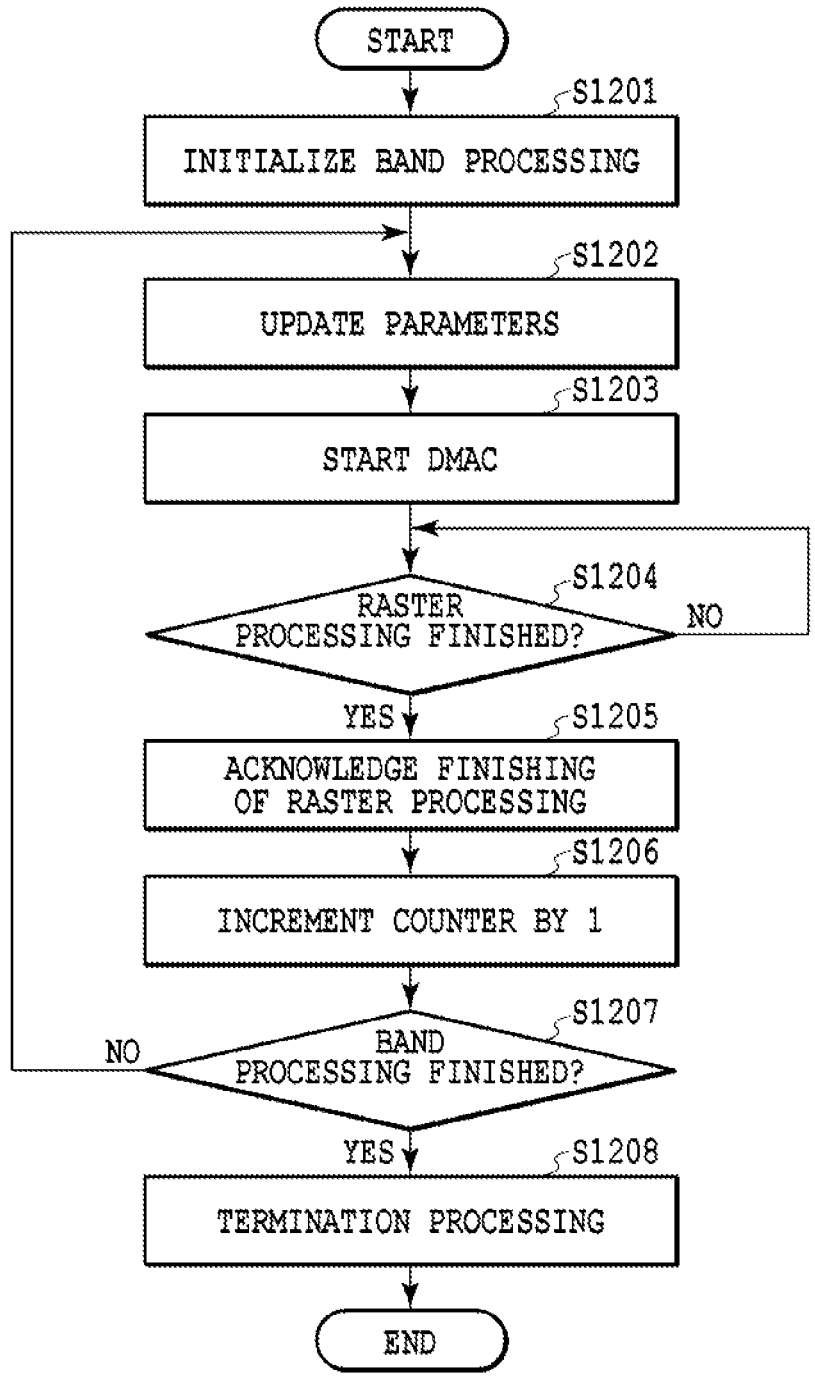
FIG. 11 is a flowchart explaining a process for finally binarizing and outputting image data executed by the control circuit 505 illustrated in FIG. 5.

FIG. 11 is a flowchart showing a processing sequence for finally binarizing and outputting input image data executed by the control circuit 505, when performing the image processing described above. The processing shown in FIG. 11 corresponds to processing for one band of data. When the CPU 102 issues instructions for initiating image processing by writing "1" to the image processing activation register 801 of the register unit 504, the register unit 504 outputs an image processing activation signal to respective units of the image processing unit 109. Upon receiving an image processing activation signal from the register unit 504, the control circuit 505 performs binarization processing by executing image processing operations, in accordance with the flowchart shown in FIG. 11.

First, in step S1201, necessary initialization processing and other operations are performed prior to initiating image processing. In the initialization processing, an internal counter (not shown) for counting the number of processed rasters is cleared, and an image processing initiation signal is output to respective units in the image processing unit 109, for example. Next, in step S1202, image processing parameters for each raster are updated. More specifically, the "current raster processing direction signal", "first raster stage signal", and "last raster stage signal" illustrated in FIG. 6A are updated and output according to the value of the counter that counts the number of processed raster and the value of the band mode register 802 set in the register unit. These respective signals are supplied to respective units in the image processing unit 109.

Next, in step S1203, the image data read DMAC 506, the image data write DMAC 507, the error data read DMAC 508, and the error data write DMAC 509 are instructed to initiate raster processing-related data transfer. In other words, the control circuit 505 instructs each DMAC (506 to 509) to initiate data transfer by outputting "1" as the "data transfer initiating instruction signal" illustrated in FIG. 6A.

Next, in step S1204, it is determined whether or not a finishing of raster processing notification has been received from each DMAC (506 to 509). The process proceeds to step S1205 when it is determined that a finishing of raster processing notification has been received from all DMACs. Also, the process returns again to step S1204 when it is determined that there exists a DMAC from which a finishing of raster processing notification has not been received. The question of whether or not a finishing of raster processing notification is received from each DMAC (506 to 509) is determined according to whether or not the raster processing completion notification output by each DMAC is "1".

In step S1205, an acknowledgement is returned to each DMAC (506 to 509) in response to the raster processing completion notifications, and the process proceeds to step S1206. In other words, the control circuit 505 acknowledges a raster processing completion notification by outputting "1" as a raster processing completion acknowledge signal.

Next, in step S1206, the content of an internal counter that counts the number of processed rasters is incremented by 1, and the process proceeds to step S1207. In step S1207, the processed raster number counted by the internal counter that counts the number of rasters is compared to a raster number set in a raster number register 804 for specifying a raster number in the register unit 504 (first determination). When the counted raster number matches the set raster number, band processing is determined to be finished, and the process proceeds to step S1208. In the case when the counted raster number has not reached the set raster number, the process returns to step S1202, and raster processing is repeated again. When raster processing finishes for all rasters, band processing termination processing is performed in step S1208, and the present processing operation is terminated. In this step, an interrupt signal to the CPU 102 is activated, for example.

In the present embodiment, processing in accordance with the flowchart shown in FIG. 11 is stated by a hardware description language (HDL), and by performing logical synthesis based thereon, a logical circuit capable of executing the present image processing operation is generated. A logical circuit generated by this logical synthesis then constitutes a control circuit.

Next, respective processing sequences for the error data read DMAC 508 and the error data write DMAC 509 will be described with reference to FIGS. 12 and 13. These processes are activated by the processing in step S1203 of FIG. 11.

Figure 12:
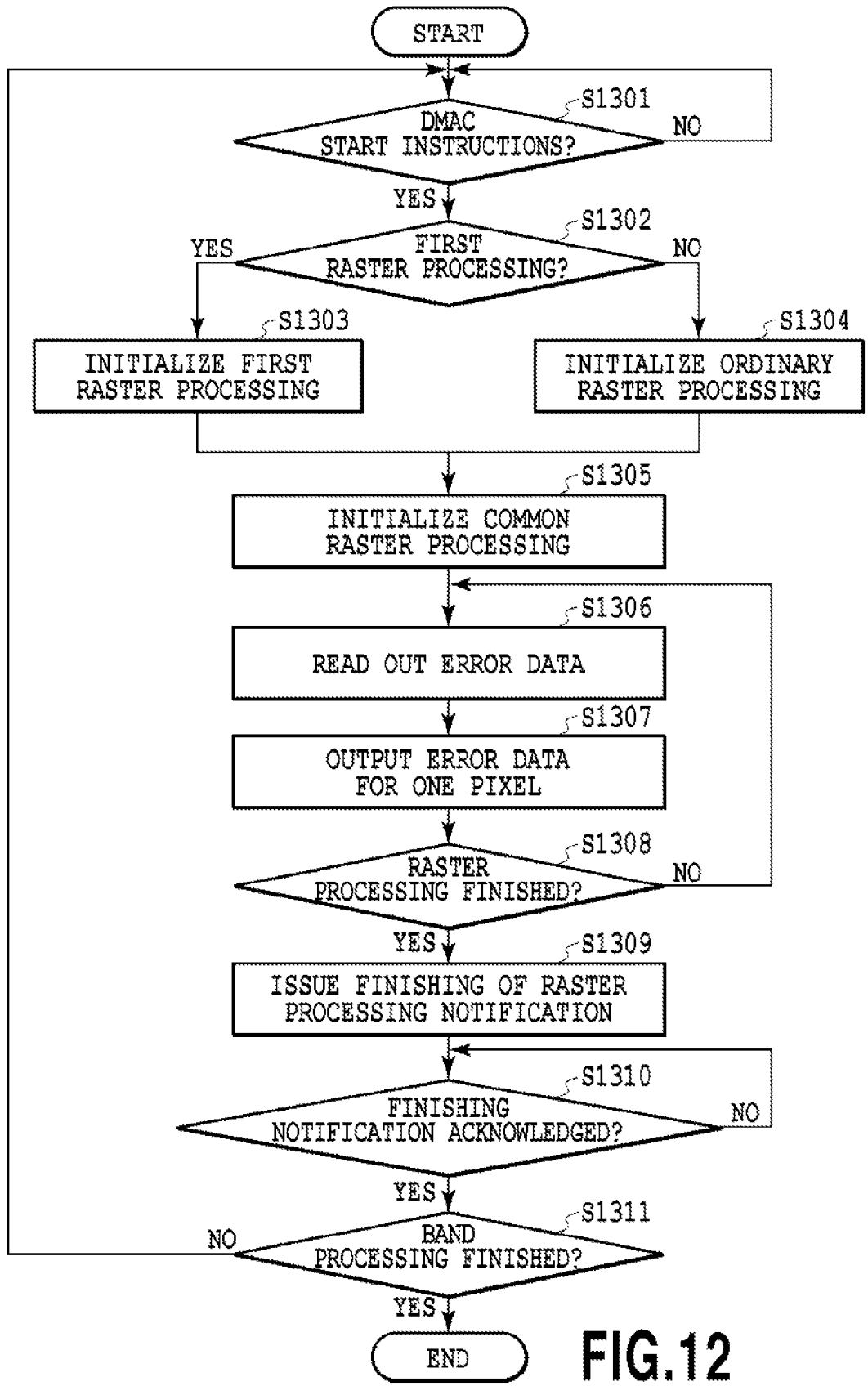
FIG. 12 is a flowchart explaining operation of the error data read DMAC illustrated in FIG. 5.

First, in step S1301 of FIG. 12, the error data read DMAC 508 determines whether or not it has been instructed to initiate data transfer by the control circuit 505, and the process proceeds to step S1302 in the case when the error data read DMAC 508 has been instructed to initiate data transfer. In contrast, the process returns to step S1301 again in the case when the error data read DMAC 508 has not been instructed to initiate data transfer. The question of whether or not the error data read DMAC 508 has been instructed to initiate data transfer by the control circuit 505 is determined according to whether or not a data transfer initiating instruction signal is "1".

Next, in step S1302, the error data read DMAC 508 determines if the raster being processed is the first raster, and also if an address for the first raster is used (second determination). The process proceeds to step S1303 in the case when the conditions are satisfied, and to step S1304 in the case when the conditions are not satisfied. It is determined that the conditions are satisfied in the case when a first raster stage signal output by the control circuit 505 is "1" and a first raster usage address signal output by the register unit 504 is "1". More specifically, the case when the first raster usage address signal is "1" corresponds to the case when the value of bit "0" of the processing mode register 803 shown in FIG. 8B is "1". This is a setting that enables the reading out of error data in the RAM 116. On the other hand, the case when the conditions are not satisfied corresponds to the case when the first raster stage signal is "1" and the first raster use address signal is "0". This is the case when the value of bit "0" of the processing mode register 803 shown in FIG. 8B is "0". This differs from the processing in the above case when the conditions are satisfied described hereafter, and is a setting that disables the reading out of error data in the RAM 116, even though the processing target is the first raster. For example, in the case of a mode that prints using four colors of inks, a series of image processing operations could be performed to obtain binary print data in a single processing cycle with the circuit of the present embodiment able to process a maximum of six colors. Consequently, one line of error data for the first raster for four colors can be stored in the error buffer 510 in the circuit. For this reason, the reading out of error data is made to be performed in the error buffer 510 and not in the RAM 116, even though the processing target is the first raster. This is similar to the case of writing error data when processing the last raster described later with reference to FIG. 13.

More specifically, in a first mode (a mode using six colors), in which the number of colors of a processing target is relatively great, the error diffusion processing for each of the first raster and the last raster enables accessing RAM 116. On the other hand, in a second mode (a mode using four colors), in which the number of colors of a processing target is relatively small, the error diffusion processing for each of the first raster and the last raster disenables accessing RAM 116.

Referring to FIG. 12 again, next, in step S1303, the error data read DMAC 508 uses the first raster origin corresponding address to calculate a read source address, and the process proceeds to step S1305. At this time, a memory address is calculated from the leftmost pixel address set in the register unit 504 in the case when the processing direction is the forward direction, while a memory address is calculated from the rightmost pixel address set in the register unit 504 in the case when the processing direction is the reverse direction. Also, the processing direction of the raster being processed is acquired from a current raster processing direction signal output by the control circuit 505.

On the other hand, in step S1304, the error data read DMAC 508 uses a common origin corresponding address to calculate a read source address, and the process proceeds to step S1305. At this time, and similar to step S1303, a memory address is calculated by using the leftmost pixel address or the rightmost pixel address according to the processing direction.

Next, in step S1305, the error data read DMAC 508 performs other initialization processing related to raster processing, and specifies parameters other than the read source memory address. Also, the error data read DMAC 508 clears a counter (not illustrated) in the error data read DMAC 508 that counts the number of processed pixels.

Next, in step S1306, the error data read DMAC 508 reads out error data from the read memory address, stores the error data in a buffer (not illustrated) in the error data read DMAC 508, and also updates the read memory address. Herein, the address is updated in an increasing direction in the case when a raster is being processed in the forward direction, and in a decreasing direction in the case when a raster is being processed in the reverse direction.

In step S1307, the error data read DMAC 508 outputs error data stored in the buffer by the processing in step S1306 to the quantization processing circuit 502 by one pixel basis. Also, the content of an internal counter that counts the number of processed pixels is incremented by one, and the process proceeds to step S1308.

In step S1308, it is determined whether or not the processed pixel number being counted by the internal counter has reached the pixel number of one raster. The process proceeds to step S1309 in the case when the pixel number has been reached, while the process returns to step S1306 and continues reading out error data in the case when the pixel number has not been reached. Herein, the pixel number of one raster is calculated as a value equal to one plus the difference between the leftmost pixel coordinate and the rightmost pixel coordinate.

When error data for one raster of pixels is read out, in step S1309, the error data read DMAC 508 notifies the control circuit 505 that raster processing is complete, and the process proceeds to step S1310. More specifically, the error data read DMAC 508 notifies the control circuit 505 that raster processing is complete by outputting "1" as a raster processing completion notification signal.

Next, in step S1310, the error data read DMAC 508 determines whether or not an acknowledgment has been returned from the control circuit 505 in response to the raster processing completion notification. The process proceeds to step S1311 in the case of an acknowledgment, and returns to step S1310 in the case of no acknowledgment. The question of whether or not an acknowledgment has been returned from the control circuit 505 is determined according to whether or not a raster processing completion acknowledge signal is "1".

In step S1311, the error data read DMAC 508 determines whether or not the processed raster is the last raster in a band. The present processing operation is terminated in the case of the last raster, while the process returns to step S1301, and continues processing subsequent rasters in the case when the processed raster is not the last raster.

Figure 13:
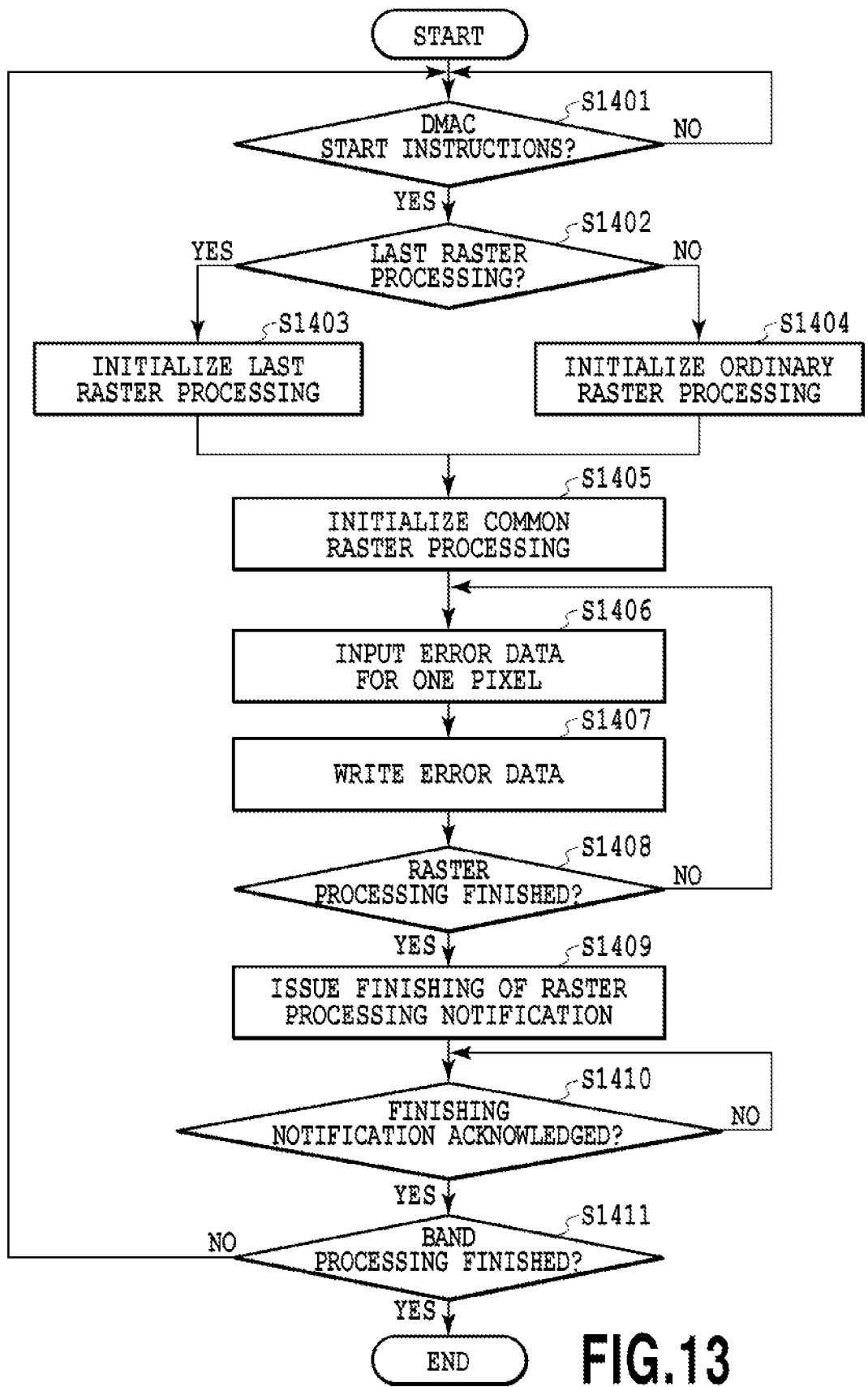
FIG. 13 is a flowchart explaining operation of the error data write DMAC illustrated in FIG. 5.

Meanwhile, in step S1401 of FIG. 13, the error data write DMAC 509 determines whether or not it has been instructed to initiate data transfer by the control circuit 505. The process proceeds to step S1402 in the case when the error data write DMAC 509 has been instructed to initiate data transfer, while the process returns to step S1401 in the case when the error data write DMAC 509 has not been instructed to initiate data transfer. The question of whether or not the error data write DMAC 509 has been instructed to initiate data transfer by the control circuit 505 is determined according to whether or not a data transfer initiating instruction signal is "1". Next, in step S1402, the error data write DMAC 509 determines if the raster being processed is the last raster, and also, if an address for the last raster is used. The process proceeds to step S1403 in the case when the conditions are satisfied, and to step S1404 in the case when the conditions are not satisfied. It is determined that the conditions are satisfied in the case when a last raster stage signal output by the control circuit 505 is "1" and a last raster usage address signal output by the register unit 504 is "1".

In step S1403, the error data write DMAC 509 uses the last raster origin corresponding address to compute a write destination address, and the process proceeds to step S1405. At this time, a memory address is computed from the leftmost pixel address set in the register unit 504 in the case when the processing direction is the forward direction, while a memory address is computed from the rightmost pixel address set in the register unit 504 in the case when the processing direction is the reverse direction. Also, the processing direction of the raster being processed is acquired from a current raster processing direction signal output by the control circuit 505.

In contrast, in step S1404, the error data write DMAC 509 uses a common origin corresponding address to compute a write destination address, and the process proceeds to step S1405. At this time, and similar to step S1403, a memory address is computed by using the leftmost pixel address or the rightmost pixel address according to the processing direction.

Next, in step S1405, the error data write DMAC 509 performs other initialization processing related to raster processing, and specifies parameters other than the write destination memory address. Also, the error data write DMAC 509 clears a counter (not illustrated) in the error data write DMAC 509 that counts the number of processed pixels. Next, in step S1406, the error data write DMAC 509 writes (stores) one pixel of error data output from the quantization processing circuit to a buffer (not illustrated) in the error data write DMAC 509. Also, the internal counter not illustrated that counts the number of processed pixels is incremented by 1, and the process proceeds to step S1407.

Next, in step S1407, the error data write DMAC 509 writes the error data that was stored in the buffer by the processing in step S1406 to the write memory address, and also, updates the write memory address. The address is updated in an increasing direction in the case when a raster is being processed in the forward direction, and in a decreasing direction in the case when a raster is being processed in the reverse direction.

In step S1408, it is determined whether or not the processed pixel number being counted by the internal counter has reached the pixel number of one raster. The process proceeds to step S1409 in the case when the pixel number has been reached, while the process returns to step S1406 and continues writing error data in the case when the pixel number has not been reached. Herein, the pixel number of one raster is computed as a value equal to one plus the difference between the leftmost pixel address and the rightmost pixel address.

When error data for one raster of pixels is written, in step S1409, the error data write DMAC 509 notifies the control circuit 505 that raster processing is complete, and the process proceeds to step S1410. In other words, the error data write DMAC 509 notifies the control circuit 505 that raster processing is complete by outputting "1" as a raster processing completion notification signal.

Next, in step S1410, the error data write DMAC 509 determines whether or not an acknowledgment has been returned from the control circuit 505 in response to the raster processing completion notification. The process proceeds to step S1411 in the case of an acknowledgment, and returns to step S1410 in the case of no acknowledgment. The question of whether or not an acknowledgment has been returned from the control circuit 505 is determined according to whether or not a raster processing completion acknowledge signal is "1". In step S1411, the error data write DMAC 509 determines whether or not the processed raster is the last raster in a band. The present processing operation is terminated in the case of the last raster, while the process returns to step S1401 and continues processing subsequent rasters in the case when the processed raster is not the last raster.

In the present embodiment, processing in accordance with the flowcharts in FIGS. 12 and 13 is stated by a hardware description language (HDL), and an error data read DMAC and error data write DMAC capable of executing the respective image processing operations are generated by performing logical synthesis. In other words, logical circuits generated by this logical synthesis respectively constitute an error data read DMAC and an error data write DMAC.

Figure 14:
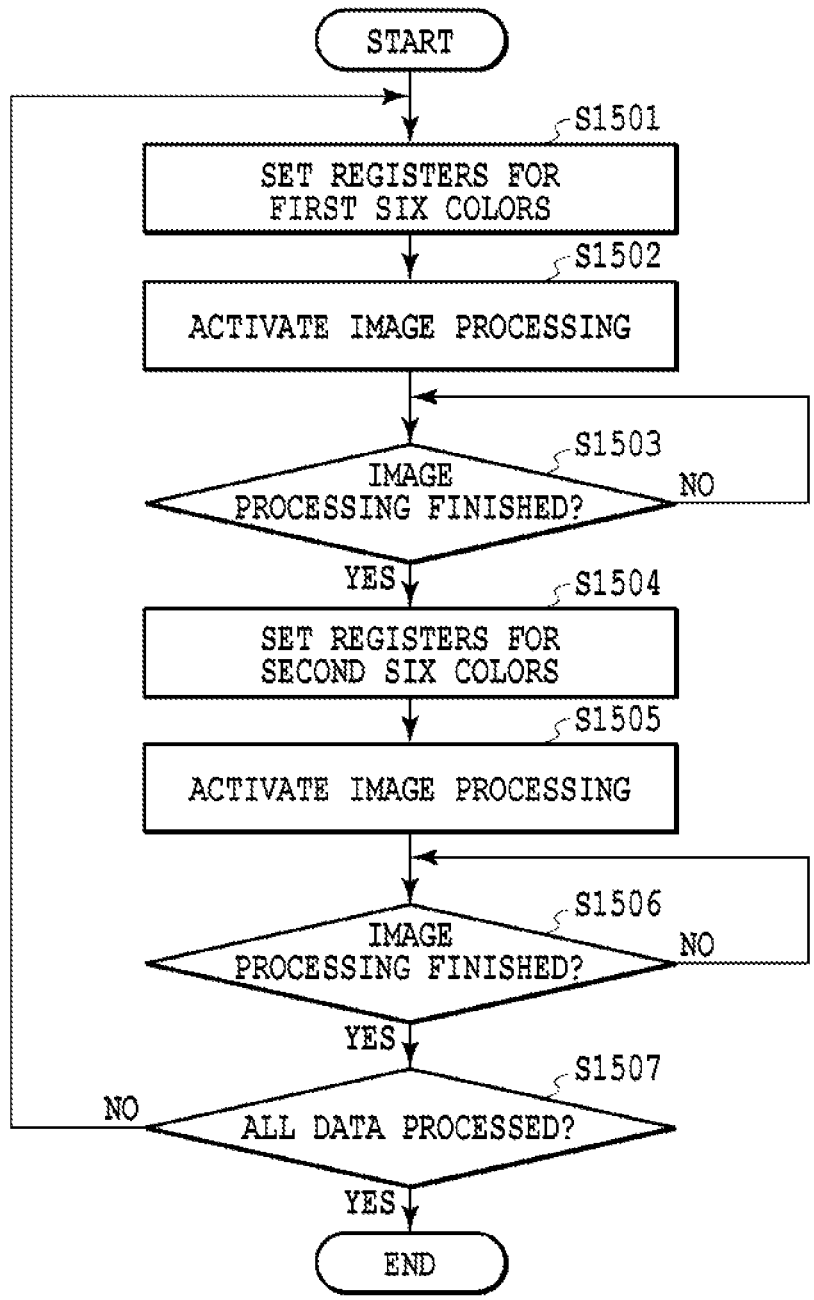
FIG. 14 is a flowchart explaining a process for generating 12-color ink print data, particularly, quantization by error diffusion, in a printing apparatus in accordance with an embodiment of the present invention.

FIG. 14 is a flowchart explaining a process for generating twelve color ink print data, particularly, quantization by error diffusion, in a printing apparatus in accordance with the present embodiment described above. As described earlier, the present process performs image processing twice on the same input image data to obtain print data of twelve colors. This processing is performed as quantization processing for one band that is made of sixty-four rasters.

First, in step S1501 of FIG. 14, the CPU 102 sets registers corresponding to the image processing for the six colors processed in the first half. In other words, the respective setting values illustrated in FIG. 15A are set in the register unit 504 of the image processing unit 109.

Next, in step S1502, the CPU 102 activates image processing by writing the value "1" to the image processing activation register 801 in the register unit 504. By the processing in this step, the image processing unit 109 executes image processing for the first six colors of one band and generates binary print data as described earlier with reference to FIG. 5 and subsequent drawings.

In step S1503, the CPU 102 stands by for the image processing for the six colors processed in the first half to end. This completion of the image processing can be determined by an interrupt notification issued by the image processing unit 109 in the processing of step S1208 in FIG. 11.

When the image processing for the six colors in the first half is completed and an interrupt notification is received, in step S1504 the CPU 102 sets registers corresponding to image processing for the six colors to be processed in the second half. In other words, the respective setting values illustrated in FIG. 15B are set in the register unit 504 of the image processing unit 109.

Next, in step S1505, the CPU 102 activates image processing by writing the value "1" to the image processing activation register 801 in the register unit 504, similar to the processing in the above step S1502. By the processing in this step, the image processing unit executes image processing for the second six colors of one band and generates binary print data. Then, in step S1506, the CPU 102 stands by for the image processing for the six colors processed in the second half to end. This completion of the image processing is determined by an interrupt notification issued by the image processing unit 109 in the processing of step S1208.

When the image processing for the six colors in the second half ends, in step S1507, the CPU 102 determines whether or not the processing of all image data is completed. The process returns to step S1501 and continues in the case when unprocessed image data remains, while the present process ends in the case where the processing of all image data is completed.

In the above print data generation, by setting the respective setting values illustrated in FIG. 15A in the register unit 504, error data is read from the RAM 116 indicated by the address 0x01200000 set in the first raster origin corresponding address register 808 when processing target is the first raster. Herein, error data for the first six colors is stored from among the error data diffused from the last raster of the processed preceding band. Also, the 64th raster is the last raster, and with this raster, error data is written to the RAM 116 indicated by the address 0x12000000 set in the last raster origin corresponding address register 809. This error data is used as error data diffused to the first raster of a following band when processing the first six colors of that following band. In contrast, with the intermediate rasters from the 2nd raster to the 63rd raster, error data reads and writes are performed with respect to the error buffer 510 indicated by the address 0xA0000000 set in the common origin corresponding address register 807.

Also, with the image processing for the second six colors wherein the respective setting values in FIG. 15B are set in the register unit 504, a first raster error data read and a last raster error data write are similarly performed in the RAM 116. Also, with the intermediate rasters other than the above first and last rasters, the error buffer 510 of the image processing unit is used as an error data storage area, similar to the case of the first six colors.

As described above, with quantization by error diffusion in accordance with the present embodiment, binarized image data for twelve colors is obtained by causing an image processing circuit that executes six-color quantization processing to operate twice. At this point, RAM 116 realized by DRAM with comparatively slow operating speeds, for example, is accessed for error data diffused to a first raster and error data diffused from a last raster. In contrast, an error buffer 510 realized by SRAM inside the image processing circuit with fast operating speeds, or in other words, short access times, is accessed for all other error data.

Thus, in the case of reading out or writing one line of error data for respective rasters, the rasters for which the RAM 116, with its comparatively slow operating speed is accessed, can be limited to only the first and last rasters. As a result, memory access speeds for reading out and writing error data can be improved overall. More specifically, in the case of executing the same image processing multiple times in order to decrease the size of the circuit executing such processing, the size of the internal circuit memory, such as the error buffer, becomes a volume corresponding to the amount of data that is divided and processed, like the six colors data in the foregoing example. For this reason, when processing transitions from the first six colors to the second six colors, for example, error data for the total of twelve colors cannot be simultaneously stored in the error buffer, and other, off-circuit memory, such as the RAM 116, is utilized. On this occasion, by limiting the accessing of this other memory to only the first and last rasters, the present embodiment is able to minimize decreases in speed due to the accessing of this memory.

As a result, it becomes possible to perform fast error diffusion processing without increasing the size of the error diffusion processing circuit, even in cases when the print data to be generated is twelve colors data or similarly large data.

Other Embodiments

The foregoing embodiment was described for the case of generating binary print data by combining quantization of image data by multi-valued error diffusion with dot arrangement patterns. However, the present invention is not limited thereto, and obviously, the present invention can be configured for a printing apparatus implementing binary error diffusion that directly binarizes image data according to a quantization process.

Also, the foregoing embodiment was described for the case wherein the CPU and respective circuit blocks are realized as a system LSI sealed in a single package. However, the present invention is not limited thereto, and some or all of circuit blocks may also be realized by respectively separate ICs or other components.

Also, the foregoing embodiment was described for the case wherein content stated by a hardware description language is logically synthesized to generate a logical circuit, and quantization processing is performed by that logical circuit. However, the present invention is not limited thereto, and the present invention also includes the case when a storage medium storing a software program that realizes the functions of the above-described embodiment is supplied to an apparatus, and quantization processing is performed by the CPU of the apparatus or a computer reading out and executing a program stored in the storage medium. In this case, the program itself that is read out from the storage medium realizes the functions of the above-described embodiment, and the storage medium storing that program constitutes the present invention. Also, the present invention includes the case when an OS or similar software operating on a computer performs some or all of the actual processing based on program code instructions of a program read out by the computer, such that the functions of the above-described embodiment are realized by such processing.

It should be noted that the above-described embodiments relate to diffusing the error to the same raster as, and one raster below, the raster to which the target pixel belongs, as shown in FIG. 9. However, a method of diffusing the error is not limited to the method described above. For example, the error generated in the target pixel may be diffused to the same raster as, and a predetermined number of rasters (two or more raster) below, the raster to which the target pixel belongs. In this case, for the processing of a range of the first raster to the n-th (n is the predetermined number) raster, access is made to RAM 116, and reading the error that is diffused to that range from RAM 116 is performed. For the processing of a range of the last raster to the n-th raster, access is made to RAM 116, and writing the error that is diffused form that range into RAM 116 is performed.

Further Embodiments

The present invention is applicable as a method of quantizing image data that expresses gradations of respective pixels, and also, as an image processing apparatus and an image processing method that use error diffusion to diffuse the error data of a target pixel to nearby pixels near the target pixel. Such an image processing apparatus may be integrally built into a printing apparatus 100, as in the foregoing embodiment, or realized in a host apparatus.

Also, the present invention is not limited in regard to printing methods for printing images based on quantized image data. Consequently, such printing methods may be printing methods other than the above-described inkjet printing method, and, in addition, the configuration of a printing apparatus that realizes such a printing method is also not limited.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus comprising:
a memory, serving as a first storage unit configured to store error data; and
as ASIC, serving as (i) an image processing circuit configured to perform quantizing processing of image data by an error diffusion method, to generate print data, the image data having a plurality of rasters, each of which is formed with a plurality of pixels, and a predetermined number of rasters arranged into a band, and (ii) a second storage unit configured to store error data that is diffused from one of the plurality of rasters by the image processing circuit,
wherein the error data to be diffused to a raster that is subjected to the quantizing processing is read from the second storage unit, and the error data to be diffused from a raster that is subjected to the quantizing processing is written to the second storage unit,
wherein the image processing circuit is capable of performing quantizing processing of image data for N colors, and performs the quantizing processing multiple times in image processing of image data for colors more than N colors,
wherein, in a case when the image processing circuit terminates quantizing processing for a given band, the error data that is to be diffused to a raster that belongs to a next band is written to the first storage unit,
wherein, in a case when the image processing circuit performs the quantizing processing for the next band, the error data that is to be diffused to a raster that belongs to the next band is read from the first storage unit, and
wherein, in a case when the image processing circuit performs image processing for image data for colors more than the N colors, the image processing circuit repeatedly performs at least a first image processing for performing image processing of image data of a first color group and a second image processing for performing image processing of image data of a second color group for each band.

2. The apparatus according to claim 1, wherein,
if the image processing circuit performs image processing of image data for colors more than N colors,
the error data that is to be diffused to the raster that belongs to a next band is written to the first storage unit in a case when the image processing circuit terminates the quantizing processing for a given band, and the error data that is to be diffused to the raster that belongs to the next band is read from the first storage unit in a case when the image processing circuit performs the quantizing processing for the next band.

3. The apparatus according to claim 1, wherein if the image processing circuit performs image processing of image data for colors equal to or less than N colors, the error data that is to be diffused to the raster that belongs to a next band is not written to the first storage unit in a case when the image processing circuit terminates the quantizing processing for a given band, and the error data that is to be diffused to the raster that belongs to the next band is read from the first storage unit in a case when the image processing circuit performs the quantizing processing for the next band.

4. The apparatus according to claim 1, wherein the first storage unit has an access speed lower than that of the second storage unit.

5. The apparatus according to claim 1, further comprising an image processing unit including the image processing circuit, wherein the first storage unit is located outside of the image processing unit and the image processing unit includes the second storage unit.

6. The apparatus according to claim 5, wherein the image processing unit further comprises a first determining unit configured to determine whether the raster subjected to the quantizing processing is a last raster in each of plural bands, and in a case when the first determining unit determines that the raster to which a pixel that is to be subjected to the quantizing processing belongs is the last raster, the error data that is to be diffused to the raster that belongs to the next band is written to the first storage unit.

7. The apparatus according to claim 5, wherein the image processing unit further comprises a second determining unit configured to determine whether the raster subjected to the quantizing processing is a first raster in each of plural bands, and in a case when the second determining unit determines that the raster to which a pixel that is to be subjected to the quantizing processing belongs is the first raster, the error data that is to be diffused to the raster that belongs to the next band is read from the first storage unit.

8. The apparatus according to claim 5, wherein the image processing unit further comprises a third determining unit configured to determine a processing direction for the raster subjected to the quantizing processing, and the image processing circuit performs the quantizing processing for each raster according to the processing direction determined by the third determining unit.

9. The apparatus according to claim 1, wherein the image processing circuit comprises a control circuit which gives instructions to write error data to the first storage unit and to read the error data from the first storage unit.

10. The apparatus according to claim 1, further comprising a print head for printing based on the print data.

11. An image processing method for an image processing apparatus comprising a memory, serving as a first storage unit configured to store error data, and an ASIC, serving as (i) an image processing circuit configured to perform quantizing processing of image data, and (ii) a second storage unit configured to store error data, the method comprising:

performing, using the ASIC, quantizing processing of image data, by an error diffusion method, to generate print data, the image data having a plurality of rasters, each of which is formed with a plurality of pixels, and a predetermined number of rasters arranged into a band, by the image processing apparatus;

writing, using the ASIC, the error data diffused from a raster that is subjected to the quantizing processing to the second storage unit;

reading, using the ASIC, the error data to be diffused to a raster that is subjected to the quantizing processing from the second storage unit to perform quantizing processing;

writing, using the ASIC, in a case when the image processing circuit terminates quantizing processing for a given band, the error data that is to be diffused to the raster that belongs to a next band to the first storage unit; and reading, using the ASIC, in a case when the image processing circuit performs the quantizing processing for the next band, the error data that is to be diffused to a raster that belongs to the next band from the first storage unit, wherein the image processing circuit is capable of performing quantizing processing of image data for N colors, and performs the quantizing processing multiple times in image processing of image data for colors more than N colors, and in a case when the image processing circuit performs image processing for image data for colors more than the N colors, the image processing circuit repeatedly performs at least a first image processing for performing image processing of image data of a first color group and a second image processing for performing image processing of image data of a second color group for each band.

12. The method according to claim 11, wherein, if the image processing circuit performs image processing of image data for colors more than N colors, the error data that is to be diffused to a raster that belongs to a next band is written to the first storage unit in a case when the image processing circuit terminates the quantizing processing for a given band, and the error data that is to be diffused to the raster that belongs to the next band is read from the first storage unit in a case when the image processing circuit performs the quantizing processing for the next band.

13. The method according to claim 11, wherein, if the image processing circuit performs image processing of image data for colors equal to or less than N colors, the error data that is to be diffused to a raster that belongs to a next band is not written to the first storage unit in a case when the image processing circuit terminates the quantizing processing for a given band, and the error data that is to be diffused to a raster that belongs to the next band is read from the first storage unit in a case when the image processing circuit performs the quantizing processing for the next band.

14. The method according to claim 11, wherein the first storage unit has an access speed lower than that of the second storage unit.

15. A non-transitory computer readable storage medium storing a program for causing a computer to execute a method for an image processing apparatus comprising a memory, serving as a first storage unit configured to store error data, and an ASIC, serving as (i) an image processing circuit configured to perform quantizing processing of image data, and (ii) a second storage unit configured to store error data, the method comprising:

performing, using the ASIC, quantizing processing of image data, by an error diffusion method, to generate print data, the image data having a plurality of rasters, each of which is formed with a plurality of pixels, and a predetermined number of rasters arranged into a band, by the image processing apparatus;

writing, using the ASIC, the error data diffused from a raster that is subjected to the quantizing processing to the second storage unit;

reading, using the ASIC, the error data to be diffused to a raster that is subjected to the quantizing processing from the second storage unit to perform quantizing processing;

writing, using the ASIC, in a case when the image processing circuit terminates quantizing processing for a given band, the error data that is to be diffused to a raster that belongs to a next band to the first storage unit; and reading, using the ASIC, in a case when the image processing circuit performs the quantizing processing for the next band, the error data that is to be diffused to a raster that belongs to the next band from the first storage unit, wherein the image processing circuit is capable of performing quantizing processing of image data for N colors, and performs the quantizing processing multiple times in image processing of image data for colors more than N colors, and in a case when the image processing circuit performs image processing for image data for colors more than the N colors, the image processing circuit repeatedly performs at least a first image processing for performing image processing of image data of a first color group and a second image processing for performing image processing of image data of a second color group for each band.

* * * * *